United States Patent
Li et al.

(10) Patent No.: US 6,965,420 B2
(45) Date of Patent: **\*Nov. 15, 2005**

(54) SPECTRUM-CONTROLLABLE REFLECTIVE POLARIZERS HAVING ELECTRICALLY-SWITCHABLE MODES OF OPERATION

(75) Inventors: Le Li, Hopewell Junction, NY (US); Bunsen Fan, Cortland Manor, NY (US); Yingqiu Jiang, Sunnyvale, CA (US); Sadeg M. Faris, Pleasantville, NY (US); Jian-Feng Li, Boulder, CO (US); Sameer Vartak, Lake Mohegan, NY (US)

(73) Assignee: Reveo, Inc., Elmsford, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/656,827

(22) Filed: Sep. 5, 2003

(65) Prior Publication Data

US 2004/0095523 A1 May 20, 2004

Related U.S. Application Data

(63) Continuation of application No. 09/326,882, filed on Jun. 7, 1999, now Pat. No. 6,633,354, and a continuation-in-part of application No. 09/093,006, filed on Jun. 5, 1998, now Pat. No. 6,369,868, said application No. 09/326,882, is a continuation-in-part of application No. 09/093,017, filed on Jun. 5, 1998, now Pat. No. 6,473,143, and a continuation-in-part of application No. 09/039,303, filed on Mar. 14, 1998, now Pat. No. 6,661,486, and a continuation-in-part of application No. 09/039,297, filed on Mar. 14, 1998, now Pat. No. 6,072,549, which is a continuation-in-part of application No. 08/805,603, filed on Feb. 26, 1997, now Pat. No. 5,940,150, which is a continuation-in-part of application No. 08/739,467, filed on Oct. 29, 1996, now Pat. No. 6,034,753, which is a continuation-in-part of application No. 08/550,022, filed on Oct. 30, 1995, now Pat. No. 5,691,789, said application No. 09/039,297, is a continuation-in-part of application No. 08/787,282, filed on Jan. 24, 1997, now Pat. No. 6,338,807, which is a continuation of application No. 08/265,949, filed on Jun. 27, 1994, now Pat. No. 5,599,412, which is a division of application No. 07/798,881, filed on Nov. 27, 1991, now Pat. No. 5,364,557, said application No. 09/039,297, is a continuation-in-part of application No. 08/715,314, filed on Sep. 16, 1996, now Pat. No. 6,188,460, and a continuation-in-part of application No. 08/743,293, filed on Nov. 4, 1996, now Pat. No. 6,133,980.

(51) Int. Cl.$^7$ ............................................. G02F 1/1334
(52) U.S. Cl. ...................... 349/115; 349/87; 349/88; 349/98; 349/176
(58) Field of Search ........................... 349/87, 88, 98, 349/115, 176

(56) References Cited

U.S. PATENT DOCUMENTS

| | | | | |
|---|---|---|---|---|
| 5,188,760 A | * | 2/1993 | Hikmet et al. | 252/299.01 |
| 5,506,704 A | * | 4/1996 | Broer et al. | 349/98 |
| 5,691,789 A | * | 11/1997 | Li et al. | 349/98 |
| 5,762,823 A | * | 6/1998 | Hikmet | 252/299.01 |
| 6,473,143 B2 | * | 10/2002 | Li et al. | 349/88 |

* cited by examiner

Primary Examiner—Andrew Schechter

(57) ABSTRACT

A light controlling film is disclosed, comprising a polymerized polymer network varying spatially in a direction normal to the film surface, where the polymerized polymer network is a crosslinked high molecular weight polymeric material mixed with a low molecular weight nematic material exhibiting cholesteric liquid crystal (CLC) order, wherein an electric field impressed in the film controls the reflection bandwidth of circularly polarized light.

18 Claims, 14 Drawing Sheets

SPECTRUM-CONTROLLABLE REFLECTIVE POLARIZERS HAVING ELECTRICALLY-SWITCHABLE MODES OF OPERATION

RELATED CASES

This is a Continuation of application Ser. No. 09/326,882, filed Jun. 7, 1999, now U.S. Pat. No. 6,633,354, and also a Continuation-in-part of application Ser. No. 09/093,006, filed Jun. 5, 1998, now U.S. Pat. No. 6,369,868; the said application Ser. No. 09/326,882 is a Continuation-in-part of Ser. No. 09/093,017 filed Jun. 5, 1998, now U.S. Pat. No. 6,473,143; Ser. No. 09/039,303 entitled "Multilayer Films Having Non Linear Spacing of Layers", by Sadeg Faris filed Mar. 14, 1998, now U.S. Pat. No. 6,661,486; and Ser. No. 09/039,297 entitled "Intelligent Glazing Structures With Additional Control Layers" by Sadeg Faris and Le Li filed Mar. 14, 1998, now U.S. Pat. No. 6,702,549, which are Continuations-in-part of application Ser. No. 08/805,603 entitled "Electro-Optical Glazing Structures Having Total-Reflection And Transparent Modes of Operation for Use in Dynamical Control of Electromagnetic Radiation" by Sadeg M. Faris and Le Li, filed Feb. 26, 1997, now U.S. Pat. No. 5,940,150, which is a continuation-in-part of: application Ser. No. 08/739,467 entitled "Super Broadband Reflective Circularly Polarizing. Material and Method of Fabricating and Using Same in Diverse Applications", by Sadeg M. Faris and Le Li filed Oct. 29, 1996, now U.S. Pat. No. 6,034,753, which is a Continuation-in-Part of application Ser. No. 08/550,022 (Now U.S. Pat. No. 5,691,789) entitled "Single Layer Reflective Super Broadband Circular Polarizer and Method of Fabrication Therefor" by Sadeg M. Faris and Le Li filed Oct. 30, 1995; application Ser. No. 08/787,282 entitled "Cholesteric Liquid Crystal Inks" by Sadeg M. Faris filed Jan. 24, 1997, now U.S. Pat. No. 6,338,807, which is a Continuation of application Ser. No. 08/265,949 filed Jun. 27, 1994, now U.S. Pat. No. 5,599,412, which is a Divisional of application Ser. No. 07/798,881 entitled "Cholesteric Liquid Crystal Inks" by Sadeg M. Faris filed Nov. 27, 1991, now U.S. Pat. No. 5,364,557; application Ser. No. 08/715,314 entitled "High-Brightness Color Liquid Crystal Display Panel Employing Systemic Light Recycling and Methods and Apparatus for Manufacturing The Same" by Sadeg Faris filed Sep. 16, 1996, now U.S. Pat. No. 6,188,460; and application Ser. No. 08/743,293 entitled "Liquid Crystal Film Structures With Phase-Retardation Surface Regions Formed Therein and Methods of Fabricating the Same" by Sadeg Faris filed Nov. 4, 1996, now U.S. Pat. No. 6,133,980; and an application submitted simultaneously with the present application entitled "Controllable Bandwidth Polarizer" by Bunsen Fan, Jian-Feng Li, Le Li, and Sadeg M. Faris; each said Application being commonly owned by Reveo, Inc, and incorporated herein by reference in its entirety.

BACKGROUND OF THE INVENTION

1. Field of Invention

The present invention relates generally to single-layer broadband reflective polarizers having electrically controllable polarization efficiencies and reflection bandwidths, and more particularly to single-layer reflective polarizers which can be electrically switched from broadband operation to narrow band operation over the visible and infrared (IR) bands, as well as single-layer reflective polarizers which can be electrically switched from narrow band operation to broadband operation over the visible and IR bands.

2. Brief Description of the Prior Art

Humans have a natural affinity for pictures. Dramatic improvements in modern display devices are possible with the advent of novel polarizer technologies. In many advanced display techniques, a polarizing device having electrically controllable transmission characteristics such as polarization, transmittance, and spectra is desired in order to actively control the display brightness as well as color balance, for example.

Electrically controllable polarizers can also serve as an enabling technology for other applications such as smart window, wherein the window transmission is electrically switchable from a totally reflective state to a totally transparent state by incorporating two switchable polarizers with opposite polarization states. Such a window can provide lighting control and can additionally provide energy conservation benefits if externally mounted.

Since early attempts at utilizing cholesteric film as optical filters and polymer encapsulated nematic liquid crystals for display devices, there has been great attention focused on trying to bring polymeric liquid crystals and cholesteric liquid crystals together to make devices or light control application.

U.S. Pat. No. 5,691,789 discloses a single-layer reflective super broadband circular polarizer and method of fabricating the same by producing a single layer having cholesteric liquid crystal (CLC) order where the pitch of the liquid crystal order varies in a non linear fashion across the layer.

European Patent Application 0 643 121 A published Mar. 15, 1995 discloses a narrow band, switchable polarizing single layer reflector.

PCT application WO97/2358, published Jul. 3, 1997, discloses a switchable polarizing single-layer reflector having a broader bandwidth.

General references on polymer dispersed liquid crystals may be found: "Polymer Dispersed Liquid Crystal Displays", by J. W. Doane; a chapter in "Liquid Crystals", Ed. B. Bahadur, World Scientific Publishing, Singapore; and "CLC/Polymer Dispersion For Haze-Free Light Shutters", by D. Yang et al. Appl. Phys. Lett. 60, 3102 (1992).

Smart Window Design is described in "Electrochromism And Smart Window Design", by C. Granqvist, Solid State Ionics 53–56 (1992) and "Large Scale Electochromic Devices For Smart Windows And Absorbers", by T. Meisel and R. Baraun, SPIE 1728, 200 (1992).

The above identified US patents and other prior art references are hereby incorporated by reference.

While there is there has been a great need in the art for a n improved single-layer electrically controllable broad-band reflective polarizer for use in diverse applications, prior art methods and technology have clearly failed to teach how to how to practice the same in a feasible manner.

OBJECTS OF THE PRESENT INVENTION

Accordingly, it a primary object of the present invention is to provide a single layer polarizing film having a very wide bandwidth which is switchable.

Another object of the invention to provide a switchable reflecting polarizing filter having a very wide bandwidth which is controllable by an electric field.

Another object of the invention to provide a switchable reflective film having little variation in the reflectivity outside of the reflective bandwidth of the film.

Another object of the invention to provide a "smart window" using a polarizing reflective film having a very wide bandwidth.

Another object of the invention to provide a "smart window" using a polarizing reflective film having a very wide bandwidth combined with a reflective multilayer polymer film having a very wide bandwidth.

Another object of the invention to provide a "smart window" using a polarizing reflective film having a very wide bandwidth combined with a reflective multilayer polymer film having little variation in the reflectivity outside of the reflective bandwidth of the film.

Another object of the invention to provide a "smart window" using a polarizing reflective multilayer polymer film having a very wide bandwidth combined with a light scattering layer for further control of transmitted light.

Another object of the invention to provide a reflective polarizing film having a bandwidth which is controllable by an electric field.

Another object of the invention to provide a "smart window" using a polarizing reflective film having a very wide bandwidth which is controllable by an electric field.

Another object of the present invention is to provide an electrically-switchable family of infrared reflective polarizers and filters, based on the remarkable properties of cholesteric liquid crystals (CLCs), having far-reaching dual-use aerospace and window-glazing applications.

Another object of the present invention is to provide electrically controllable polarizers and filters that can be remotely controlled and involve no moving parts, to active-solar-control window glazings having the unheard-of property of infrared switchability while maintaining total visible transparency.

Another object of the present invention is to provide novel near-infrared switchable polarizers, filters, and reflectors, which fulfill a market need for remote-controlled, robust, thin-film, multiple-use optical components.

Another object of the present invention is to provide fast electrically-switchable infrared reflective polarizers capable of switching from broad-to-narrow band reflective operation over the IR band.

Another object of the present invention is to provide such a fast electrically-switchable infrared reflective polarizers, wherein its rise time is about 14.5 ms and its fall time about 8.5 ms.

Another object of the present invention is to provide fast electrically-switchable infrared reflective polarizers capable of switching from narrow-to-broad band reflective operation over the IR band.

Another object of the present invention is to provide a full understanding and comprehensive model of the chemical and physical switching mechanisms, verified through computer simulations.

Another object of the present invention is to provide an electrically-tunable infrared reflective polarizer.

Another object of the present invention is to provide an electrically switchable IR reflector based on an electrically switchable-broadband reflective polarizer that operates in the IR region from 780 nm to 4 microns.

Another object of the present invention is to provide left- and right-handed CLC based switchable broadband polarizers that operate in the IR region from 780 nm to 4 microns.

Another object of the present invention is to provide a field-switchable broadband reflective polarizer operable in the NIR spectral region.

Another object of the present invention is to provide a field-switchable broadband reflective polarizer operable in the spectral region from 700 to >1000 nm, and having a polarizing bandwidth and extinction ratio which are changeable via an applied electric field. Another object of the present invention is to provide a novel method of optimizing the performance of such electro-optical structures in terms of extinction ratio, overall reflectivity, and reflection spectral cutting-off edge.

Another object of the present invention is to provide novel material recipes for making the switchable, broadband-to-narrow-band polarizers of the present invention, which enable further expansion of the polarizer bandwidth, shift to longer wavelengths, and increase the extinction ratio to the desired level.

Another object of the present invention is to provide a method of making such electrically-switchable IR reflective polarizers, using liquid crystal polymeric compounds having different pitch, cross-linking density, and polymerization rate.

Another object of the present invention is to provide an electrically-controllable narrow-band reflective polarizer which undergoes a shift in reflection band, rather than a broadening in bandwidth when a DC voltage is applied.

Another object of the present invention is to provide a novel method of precisely electrically tuning the CLC center wavelength by applying an electric field, without affecting the other specifications of the polarizer, such as polarization, extinction ratio, and bandwidth.

These and other objects of object will become apparent hereinafter and in the claims to Invention appended hereto.

SUMMARY OF THE PRESENT INVENTION

According to one of the broader aspects of the present invention, there is provided a single layer spectrum-controllable reflective circular polarizer having spectral characteristics which can be electrically controlled by application of an external electric field. The reflective polarizers are made from a cross-linkable cholesteric liquid crystal mixed with non-crosslinkable liquid crystal(s) and chiral dopant(s). These reflective polarizers reflect circularly polarized light matching its spiral sense.

In general, the present invention embraces two different types of single-layer spectrum-controllable reflective polarizer: a first-type spectrum-controllable reflective polarizer which switches from broadband reflective operation at a given polarization state, to narrow-band reflective operation at the given polarization state; and a second-type spectrum-controllable reflective polarizer which switches from narrow-band reflective operation at a given polarization state, to broadband reflective operation at the given polarization state.

The first type spectrum-controllable reflective polarizer, realizable in a 10 $\mu$m configuration, can be switched from a broadband polarizing mode (having a reflection bandwidth from about 440 nm to about 660 nm) to a narrow band polarizing mode (having a reflection bandwidth from about 420 nm to about 460 nm) by applying an AC electric field.

The first-type of polarizer according to the present invention can be realized in the form of a single layer polarizing reflective film comprising a cross linked polymer matrix mixed with low molecular weight liquid crystal molecules. The liquid crystal molecules are oriented with respect to the surface of the film and to each other in cholesteric order, and the pitch of the cholesteric order varies non-linearly across the thickness of the film so that the film reflects circularly polarized light having a broad bandwidth when no external electric field is applied across the film. The ratio of the amount of liquid crystal molecules to the amount of cross-linked polymer is chosen so that the liquid crystal molecules may rotate reversibly in an electric field, and hence destroy the cholesteric liquid crystalline order responsible for the broadband reflectivity of the polarized light. There is sufficient high molecular weight cross linked polymer material to ensure that the film is not liquid, and to ensure that the low molecular weight material does not diffuse after manufacture of the film, and to ensure hat the low molecular weight material returns to the cholesteric ordered state when the field is removed.

The second-type of reflective polarizer can be switched from a narrow band mode (having a reflection bandwidth from about 610 nm to about 680 nm) to a broadband mode (having a reflection bandwidth from about 480 nm to about 830 nm). The second-type of reflective polarizer according to the present invention can be realized in the form of a single layer polarizing reflective film comprising a crosslinked polymer matrix mixed with low molecular weight liquid crystal molecules. The low molecular weight liquid crystal molecules are oriented with respect to the surface of the film and to each other in cholesteric order. The ratio of the amount of liquid crystal molecules to the amount of cross-linked polymer is chosen so that the liquid crystal molecules may move reversibly in an electric field. The movement of the low molecular weight molecules in the presence of an applied electric field perturbs the cholesteric liquid crystalline order responsible for the reflectivity of the polarized light. If the composition of the film is uniform, the polarized reflectivity of the film has a very narrow bandwidth when there is no electric field impressed in the film. As the electric field is increased, the bandwidth of the polarized reflectivity increases. There is sufficient high molecular weight cross linked polymer material to ensure that the film is not liquid, and to ensure that the low molecular weight material does not diffuse after manufacture of the film, and to ensure that the low molecular weight material returns to the cholesteric liquid crystal ordered state when the field is removed.

BRIEF DESCRIPTION OF THE DRAWINGS

For a fuller understanding of the objects of the present invention, the following Detailed Description is to be read in conjunction with accompanying drawings, wherein.

DETAILED DESCRIPTION OF THE PRESENT INVENTION

Figure 1:
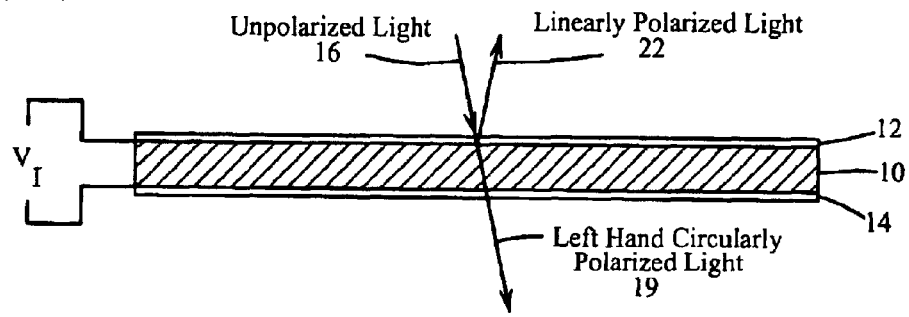
FIG. 1 shows the reflective polarizing film according to the first generalized embodiment of the present invention.

Referring now to the accompanying figures, the preferred embodiments of the present invention will now be described in detail, wherein like structures will be denoted by like reference numerals.

The switchable polarizers of the present invention can be classified into two distinct types by virtue of their modes of operation, namely: Broadband to narrow-band transition when field is applied; and Narrow-band to broadband transition when field is applied. These two types of switchable polarizers will be described in detail below.

First Type Spectrum Controllable Reflective Polarizer

The first type of reflective polarizer is made from a high molecular weight reactive cholesteric liquid crystal polymer material mixed with conventional low molecular weight liquid crystal(s) and a chiral dopant(s). The resulting polarizers reflect circular polarized light matching their spiral senses. A 10 micrometer thick polarizer, with a bandwidth from 440 nm to 660 nm, can be switched from a broadband reflection mode to a narrow-band transmission mode by applying an electric field.

Using a material blend containing a reactive cholesteric liquid crystalline (CLC) compound, other non-reactive liquid crystal(s) and chiral dopant(s), the switchable polarizer according to the first generalized embodiment is created by a mechanism termed as ultraviolet (UV) polymerization induced molecular re-distribution (PIMRD) which is responsible for creating a nonlinear helical pitch distribution along the CLC helical axis. Polymerization induces segregation of the non-reactive compounds from the polymer. As a result, some diffusing non-reactive molecules are "trapped" in the polymer network during the polymerization. At sites where more non-reactive nematic liquid crystalline molecules are accumulated, the helical pitch becomes longer. Ultimately, this PIMRD mechanism yields a non-uniform helical pitch distribution throughout the mixture, resulting in a switchable broadband reflective polarizer. This redistribution is described in great detail in U.S. Pat. No. 5,691,789, by Le Li and Sadeg M. Faris, entitled "Single Layer Reflective Super Broadband Circular Polarizer And Method of Fabrication Therefor".

Cross linking or polymerization of the high molecular weight molecules takes place at different rates in different places in the material, and the non-reactive compounds are pushed out from the more cross linked or polymerized material and segregated as reported in an article by Yang, D. K., Chien, L.-C., and Doane, J. W., Appl. Phys. Lett. 60, p 3102 (1992). As a result, some diffusing non-reactive molecules are "trapped" in the polymer network during the polymerization. At sites where more non-reactive nematic liquid crystalline molecules are accumulated, the polymerization rate is lower, and the helical pitch become longer. Ultimately, this PIMRD mechanism yields a non-uniform helical pitch distribution throughout the mixture, resulting in a switchable broadband reflective polarizer.

The non linear pitch distribution may be attained by polymerizing with light, where the intensity of the light varies throughout the layer of material. This happens naturally if the material mixture absorbs the light strongly. The mixture is merely irradiated at a low enough intensity to allow diffusion of the non-reactive nematic liquid crystalline molecules from one surface of the mixture to the other.

Appropriate light absorbing molecules may be added to the mixture, or a wavelength of the light may be chosen which is strongly absorbed in one of the constituents of the mixture which is necessary for the function of the broad band polarizer. Other methods of polymerization as known in the art may be used as well, so long as the requisite non linear light absorption results. Such methods as electron or other beam irradiation, or heating with a large temperature gradient across the material, could also be used.

When the reactive HMW material has been cross linked or polymerized, the high molecular weight (HMW) polymer material forms a matrix holding the low molecular weight (LMW) liquid crystal material. The high molecular weight polymer material is preferably itself a cholesteric liquid crystal (CLC) material, but it is not necessarily so. The main function of the high molecular weight material is to form the matrix which stabilizes the low molecular weight material. The low molecular weight material is aligned with respect to the surface, and has CLC order before polymerization and retains the order after polymerization. After polymerization, an electric field in the material may rotate the low molecular weight molecules if the density of the cross linking is low enough, and the CLC order will be changed or disrupted. When the electric field is removed, the polymer material acts somewhat like a spring to return the low molecular weight molecules to the original position, restoring the CLC order and the polarized reflectivity. If too little polymer is used, the material will be too liquid and the low molecular weight molecules may diffuse and reduce the non linearity of the pitch distribution, which would result in a narrow band polarizer. If too much polymer is used, the low molecular weight materials will no longer be able to rotate, and the material will not be switchable except under extremely high fields.

A general method for making the switchable polarizers of the present invention will be described below. Thereafter, particular recipes will be described for making such reflective polarizers. A special right-handed reactive cholesteric liquid crystalline compound is mixed with a commercial nematic liquid crystal and certain amount of chiral dopant. The purpose of adding chiral dopant is to adjust the helical pitch. Photo-initiator is also added to start the polymerization process. A commercial UV light source, wavelength centered at 365 nm, was used to polymerize the mixture. Spectrometry was carried out with a Perkin-Elmer Lambda 19.

A device, made of two ITO glass sheets coated with rubbed polyamide and separated by 10 $\mu$m glass fiber spacers, is filled with the liquid crystal mixture, and then irradiated with UV light at an elevated temperature along the CLC helical axis. Polymerization induces segregation of the non-reactive compounds from the polymer. As a result, some diffusing non-reactive molecules are "trapped" in the polymer network during the polymerization. At sites where more non-reactive nematic liquid crystalline molecules are accumulated, the helical pitch becomes longer. Ultimately, this PIMRD mechanism yields a non-uniform helical pitch distribution throughout the mixture, resulting in a switchable broadband reflective polarizer.

Both liquid crystal polymers and low-molecular-weight liquid crystals have been procured and extensively surveyed with the objective of understanding the "tools" available in practicing the switchable polarizer of the present invention.

Some of the polysiloxane liquid crystal materials from Wacker (Germany) and acrylate liquid crystal compounds from BASF (Germany) are effective in creating a field-switchable broadband reflective polarizer in the visible when mixed with E44 low molecular weight liquid crystal from EMI (Hawthorne, N.Y.). Polymerizable liquid crystal materials from different vendors, as shown in Table I.

TABLE I

Polymerizable Liquid Crystal Materials

| Supplier | Code number | Intrinsic properties | Comments |
| --- | --- | --- | --- |
| Wacker | CC4070L (L1449) | LH*, Red (690 nm**), Tiso*** = 100–120° C.; | Polysiloxane |
| Wacker | SLM90031 | LH, 309 nm, Tiso = 100–120° C.; | Polysiloxane |
| Wacker | SLM90032 | LH, 390 nm, Tiso = 100–120° C.; | Polysiloxane |
| Wacker | CC4039R (SEY3212) | RH****, 390 nm, Tiso = 100–120° C.; | Polysiloxane |
| Wacker | Cholesterol acetate | Chiral additive (LH) | Non-polymerizable |
| Wacker | CLM002CC (LoW2412-A) | LH, 390 nm, Tiso = 100–120° C.; | Polysiloxane |
| Wacker | CLM003CC (100 g) (LoW2412-B) | LH, 690 nm, Tiso = 100–120° C.; | Polysiloxane |
| Wacker | CLM004CC (100 g) (LoW2412-C) | LH, 390 nm, Tiso = 100–120° C.; | Polysiloxane |
| Wacker | CLM005CC (80 g) (LoW2412-E) | LH, 390 nm, Tiso = 100–120° C.; | Polysiloxane |
| BASF | CM182 (0.2 kg) | RH 966 nm; High Cross-linking Density (HCD) | Acrylate based |
| BASF | CM181 (0.5 kg) | RH, 365 nm, Low Cross-linking Density (LCD) (25% bisacrylates); Tiso = 90° C. | Acrylate based |
| BASF | CM171 (0.5 kg) | RH, 507 nm, Medium Cross-linking Density (MCD); Tiso = 70° C.; Visc. = 1–2 Pas (by adding toluene) | Acrylate based |
| BASF | CM171* (0.1 kg) | LH, 556 nm, LCD; | Acrylate based |
| BASF | CM170 (0.5 kg) | RH, 365 nm, LCD (25% bisacrylates); Tiso = 120° C. | Acrylate based |
| BASF | CM177 (0.5 kg) | RH, 955 nm, MCD; Tiso = 70° C. | Acrylate based |
| BASF | CM170* (0.5 kg) | RH, 504 nm, MCD; Tiso = 45° C. | Acrylate based |
| BASF | CM177* (0.1 kg) | LH, 980 nm, HCD; Tiso = 70° C. | Acrylate based |
| BASF | CM181* (0.1 kg) | LH, 495 nm, MCD | Acrylate based |

Notes:
*LH refers to left-handedness
**The number indicates the selection wavelength
***Tiso refers to isotropic transition temperature.
****RH refers to right-handedness.

Different polymerizable liquid crystal materials have different crosslinking densities. The cross-linking density for BASF liquid crystal materials is defined as follows:
Low Cross-Linking Density:
  25% non-polymerizable
  50% Monocrylate
  25% Bisacrylate
Medium Cross-Linking Density:
  10% non-polymerizable
  35% Monocrylate
  55% Bisacrylate High Cross-Linking Density:
  100% Bisacrylate
Table II lists the collected non-polymerizable materials, primarily from EMI.

TABLE II

Low Molecular Weight Liquid Crystal Materials

| Supplier | Code number | Intrinsic properties | Comments |
| --- | --- | --- | --- |
| EMI | E7 | Nematic | Mixture |
| EMI | E44 | Nematic | Mixture |
| EMI | K15 | Nematic | Single compound |
| EMI | K24 | Nematic | Single compound |
| EMI | M15 | Nematic | Single compound |
| EMI | ZLI-2309 | Nematic | Mixture |
| EMI | ZLI-5800-100 | Nematic | Mixture |
| EMI | ZLI-2806 | Nematic | Mixture |
| EMI | ZLI-33086265 | Nematic | Mixture |
| EMI | ZLI-3103 | Nematic | Mixture |
| EMI | CB15 | RH chiral additive | Single compound |
| EMI | R1011 | RH chiral additive | Single compound |
| EMI | S1011 | LH chiral additive | Single compound |

As an example, a switchable polarizer according to the first generalized embodiment of the present invention has been obtained from samples of a liquid crystal mixture made from a first recipe consisting of 1.9% by weight of a high molecular weight (HMW) CLC polymer CC4039R obtained from Wacker chemical, 96.6% of a low molecular weight (LMW) nematic material E7 from EMI chemical, 0.05% of a photoinitiator IG184 obtained from Ciba Geigy, 0.59% of a chiral additive S1011 from EMI, and 0.82% of another chiral additive CB15 from EMI. In samples made according to this recipe, the intrinsic polarizing bandwidth before polymerization was estimated to be 60 nm. After being polymerized at room temperature by a UV intensity of 0.72 mW/cm2, the bandwidth was increased to 120 nm. When no electric field is applied, the polarizer exhibits a high reflectivity to the right handed circularly polarized light within a bandwidth of 120 nm. However, it is not reactive to the left-handed circularly polarized light. If a sufficient electric field was applied, the reflectivity drops to almost zero and passes all polarizations of light.

To further enhance the performance of the switchable broadband polarizer, in terms of polarizing bandwidth, switchability and efficiency, extensive material research has been carried out to develop a special reflective polarizer whose reflectivity as well as the polarizability can be switched back and forth via an electric field. Different liquid crystal polymer materials have been tried for mixing with the low molecular weight nematic E44 from EMI, chiral additives, and photo initiator, according to different ratios. Ultimately, two kinds of single layer switchable reflective polarizers have been created through this program. They are made from a reactive cholesteric HMW liquid crystalline compound (BASF) mixed with a non-reactive LMW nematic liquid crystal compound and certain amount of chiral dopant.

The new polarizers are made from a reactive HMW cholesteric liquid crystal polymer mixed with conventional low molecular weight liquid crystal molecules and a chiral dopant(s). The resulting polarizers reflect circular polarized light matching their spiral senses. When in the polarizing state, they exhibit a contrast ratio higher than 10:1 and a bandwidth greater than 220 nm in the visible region.

When no electrical field is applied to the first type of broadband switchable polarizer, the polarizer exhibits a broadband polarizing reflective state in the visible from 440 nm to 660 nm. This polarizer can be switched from the polarizing reflection mode to a transmission mode by applying an AC or DC electric field.

The following recipes use special right-banded reactive HMW cholesteric liquid crystalline compounds with a commercial nematic liquid crystal and certain amount of chiral dopant. The purpose of adding chiral dopant is to adjust the helical pitch. Photo-initiator was also added to start the polymerization process. Details of a number of recipes follow:

Second recipe: 15% CM170* (504 nm)(BASF), 28% CB15 (EMI), 55% E44(EMI), 2% IG184(Ciba Geigy). Cell thickness d=8, curing temperature 35° C., UV intensity 10-6 mW/cm2. Bandwidth from 422~660 nm (right-handed) when no voltage is applied. Extinction ratio 10:1, switching voltage 120V (rms) at 1000 Hz. CM170* cross-linking density is medium.

Third recipe, CM171 (544 nm) (BASF)=20%, CB15=30%, E44=48%, IG184=2%. Cell thickness d=8, curing temperature 35° C., UV 10-6 mW/cm2. Bandwidth from 430~640 nm (right-handed) when no voltage is applied. Extinction ratio 7:1, switching voltage 120V (rms) at 1000 Hz. CM171 cross-linking density is medium.

Fourth recipe, CM171 (544 nm) (BASF)=13.6%, CB15=20%, E44=59.8%, R1011=2.3%, R811 (EMI)=2.3%, IG184 1.9%. Cell thickness d=8, curing temperature 35° C., UV 10-6 mW/cm2. Bandwidth from 440~620 nm (right-handed) when no voltage is applied, extinction ratio 6:1, switching voltage 120V (rms) at 1000 Hz. CM171 cross-linking density is medium.

Fifth recipe, CM171* (556 nm) (BASF)=134%, E44=70.9%, S1011=5.9%, S811=8%, IG184 1.7%, d=8, curing temperature 35° C., UV 10-6 mW/cm2. Bandwidth from 540~820 nm (left-handed) when no voltage is applied, extinction ratio 6:1, switching voltage 120V (rms) at 1000 Hz. CM171* cross-linking density is low.

Sixth recipe, CM181* (579 nm)=15%, E44=80%, S1011=5%, S811=5%, and photoinitiator=4% IG651 photoinitiator from Ciba Geigy. A commercial UV light source, wavelength centered at 365 nm, was used to polymerize the mixture. Spectrometry was carried out with a Perkin-Elmer Lambda 19.

The samples were made of two indium tin oxide (ITO) covered glass sheets coated with rubbed polyamide separated by glass fiber spacers and filled with liquid crystal mixture, and then irradiated with UV light at a elevated temperature.

Various particular embodiments of first generalized embodiment of the present invention may be understood by reference to the figures. FIG. 1 shows the film 10 of the invention comprising a cross linked or polymerized material having a high molecular weight component and a low molecular weight CLC component. Film 10 is contacted by electrically conducting materials 12 and 14 which may have a voltage V1 applied to impress and electric field in the material of the invention. The materials 12 and 14 may contact the film 10 or be closely adjacent film 10. Unpolarized light 16 is shown incident on film 10 through conducting material 12, which is transparent to the light 16. Right hand circularly polarized light 18 is shown reflecting from film 10, while left hand circularly polarized light is shown transmitted through film 10 and through material 14. If material 14 absorbs the left hand circularly polarized light remaining after transmission through film 10, the device of FIG. 1 is a polarizer. If light 19 is transmitted, the device of FIG. 1 is a polarizing beamsplitter. When the field is impressed in film 10 by raising the voltage V1, the right hand circularly polarized light 18 disappears. If the light incident on to film 10 is right hand circularly polarized, the voltage may be used to change the device of FIG. 1 from a reflector of the light to a transmitter of the light.

Figure 2:
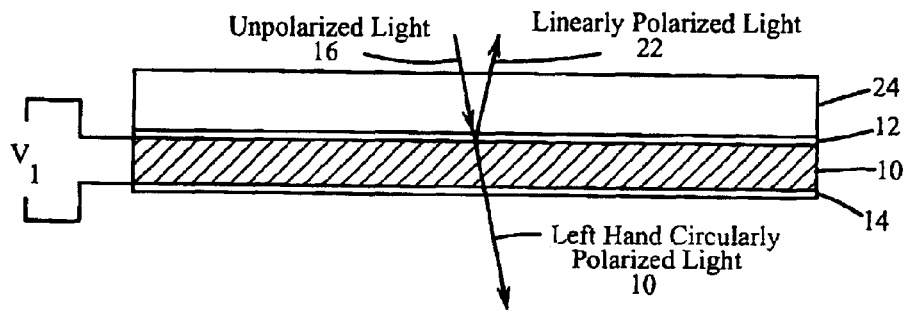
FIG. 2 shows the device of FIG. 1 with the addition of a $\lambda/4$ phase retardation plate.

FIG. 2 shows the device of FIG. 1 with the addition of a p/4 phase retardation plate 24. Unpolarized light incident on the device of FIG. 2 will be result in linearly polarized light being controllably reflected from the device. If linearly polarized light of the correct polarization is incident on the device of FIG. 2, the voltage may be used to controllably reflect or transmit the light.

Figure 3:
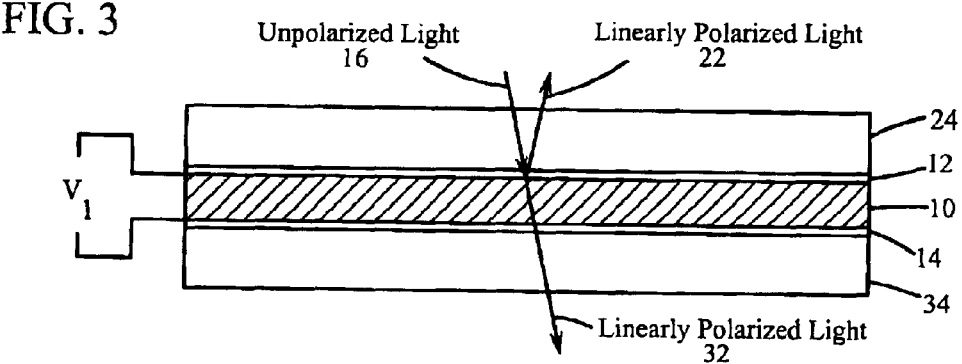
FIG. 3 shows the device of FIG. 2 with an additional $\lambda/4$ phase retardation plate.

FIG. 3 shows an additional embodiment of the device of FIG. 2, whereby an additional p/4 phase retardation plate 34 converts the circularly polarized light remaining from the initially unpolarized incident light to a linearly polarized light beam 32 which has opposite polarization to the reflected beam 22.

Figure 4:
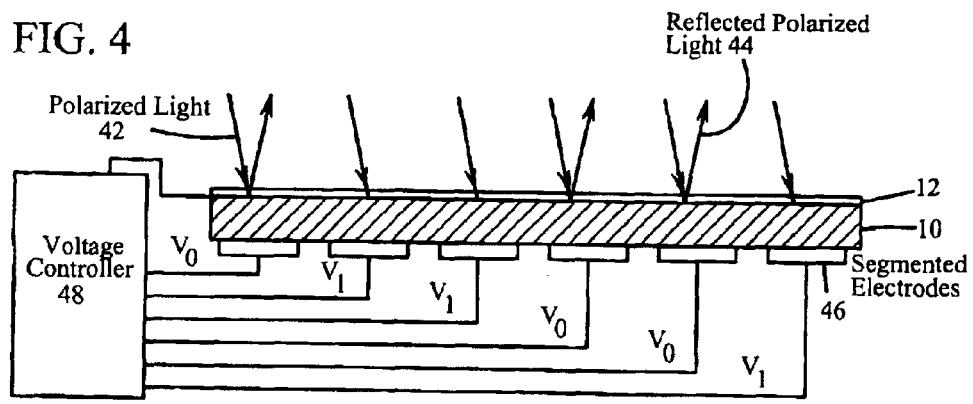
FIG. 4 shows an embodiment of the reflective polarizing film of the first generalized embodiment of the present invention used for display purposes.

FIG. 4 shows an embodiment of the film of the invention used for display purposes. The electric field in the film 10 of the invention is controlled to vary spatially across the area of the film 10 by a voltage controller 48 applying varying voltages to segmented electrodes 46. Light 42 is reflected or not from the various areas of the film to give a display. In the case shown, polarized light may be used for light 42, and the polarized light in transmission may also be used as a display.

Figure 5:
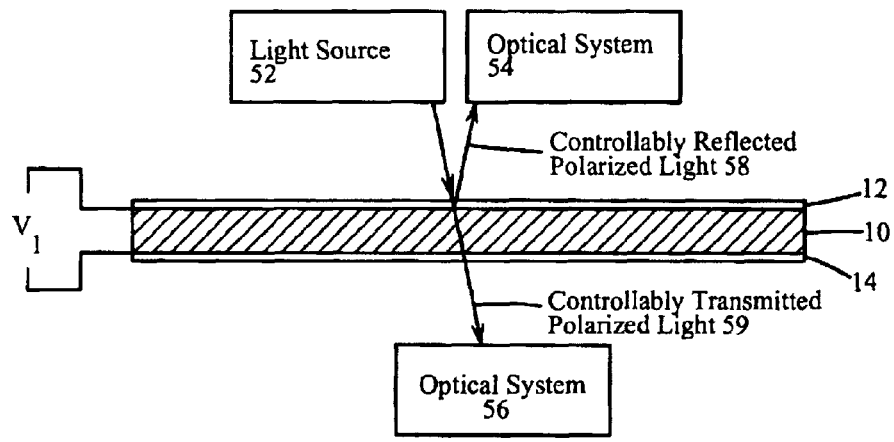
FIG. 5 shows an optical system using the reflective polarizing film of the first generalized embodiment of the present invention.

FIG. 5 shows an optical system using the film of the invention, whereby the switchable broadband polarized light beam 58 may be used in further optical systems 54, and the transmitted light beam 59 may be switched from polarized to unpolarized by the voltage applied across the conducting materials 10 and 12.

Figure 6:
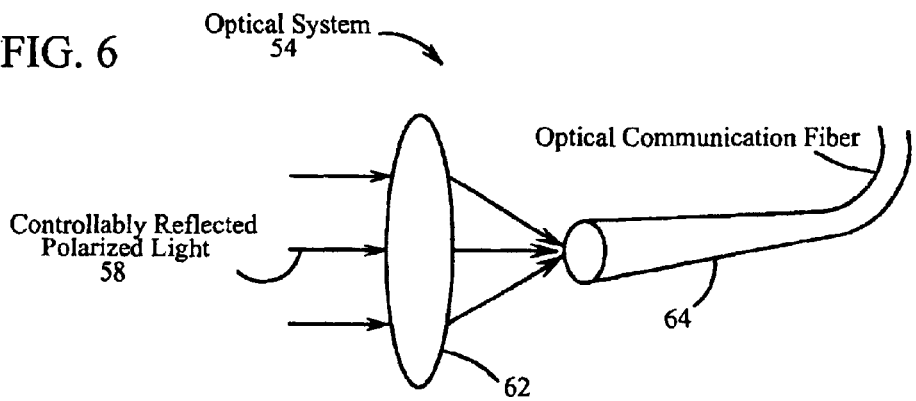
FIG. 6 shows an optical system for an optical communication fiber, made using the reflective polarizing film according to the first generalized embodiment of the present invention.

FIG. 6 shows one example of an optical system 54 for injecting a controlled polarized light beam 58 through a lens 62 into an optical communication fiber 64.

Figure 7:
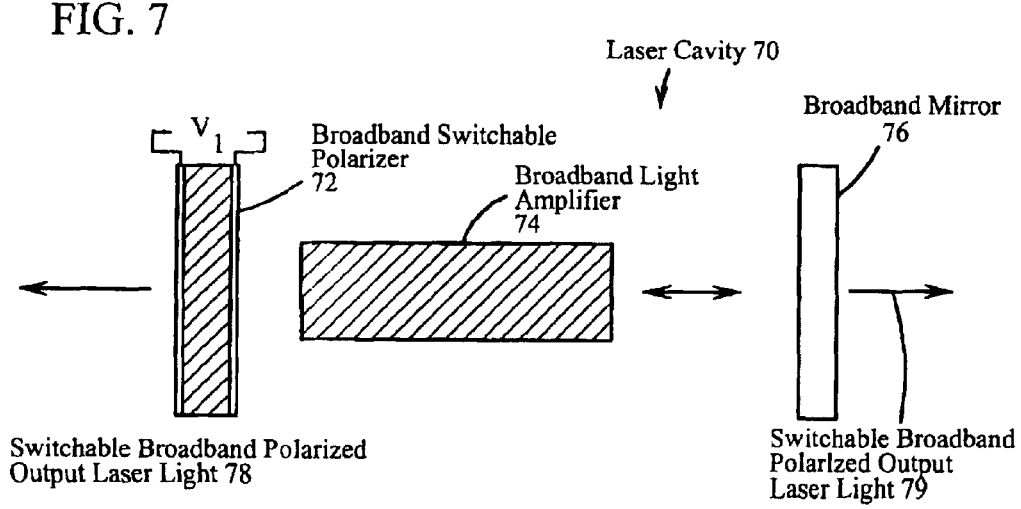
FIG. 7 shows the polarizing reflective film according to the first generalized embodiment of the present invention, employed as a cavity element in a laser cavity.

FIG. 7 an embodiment using the voltage controlled film of the invention as a cavity element in a laser cavity 70. The switchable polarizing film is used here as cavity reflector 72 for a cavity comprising the switchable polarizing film, a broadband light amplifier 74, and a broadband mirror 76. The device of FIG. 7 will lase and produce a broad bandwidth of laser light when the reflectivity of the mirror 72 reaches a threshold. The laser output may be drawn either from the mirror 72 or from the mirror 76, or both, depending on the transmissions of the cavity reflectors.

Figure 8:
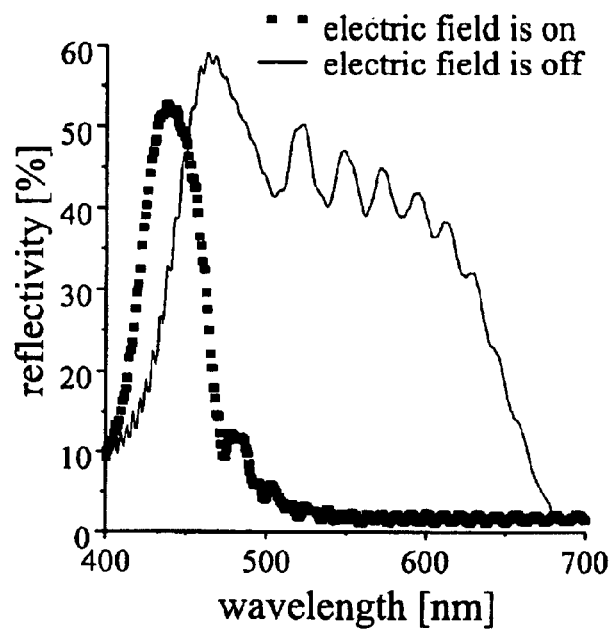
FIG. 8 shows the reflection spectrum of a typical switchable reflective polarizer according to the first generalized embodiment of the present invention.

In FIG. 8, the reflection spectrum of a typical switchable polarizer made from recipe #2 is illustrated, which was measured with an unpolarized light source. A reflection band from 440 nm to 660 nm with average reflectivity around 45% was obtained from the unpolarized probing beam. Upon applying an AC electric field (10V/micrometer), averaged reflectivity drops dramatically to a mere 2% (after correcting for the 4% surface reflection).

We believe that the reflection peak at around 440 nm, while the AC field is on, is due to the cholesteric liquid crystal polymer network which will not be disturbed by the electric field. Experimentation by one of ordinary skill in the art, using the information contained in this specification, may be used to find CLC polymer materials which will push the reflection peak into the (non visible) UV. Experimentation by one of ordinary skill in the art, using the information contained in this specification, to find non CLC polymers may also be used to reduce the remaining peak.

Figure 9:
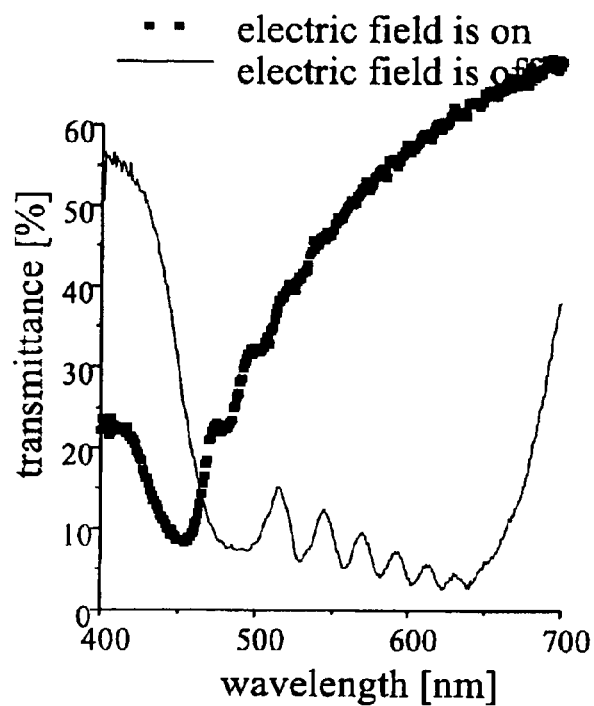
FIG. 9 shows the transmission spectrum of a sample shown in FIG. 8.

FIG. 9 presents the transmission spectrum of a sample made with recipe #2 with and without AC field applied to the polarizer, here the probing beam was right-handed polarized ("crossed" with the sample).

Figure 10:
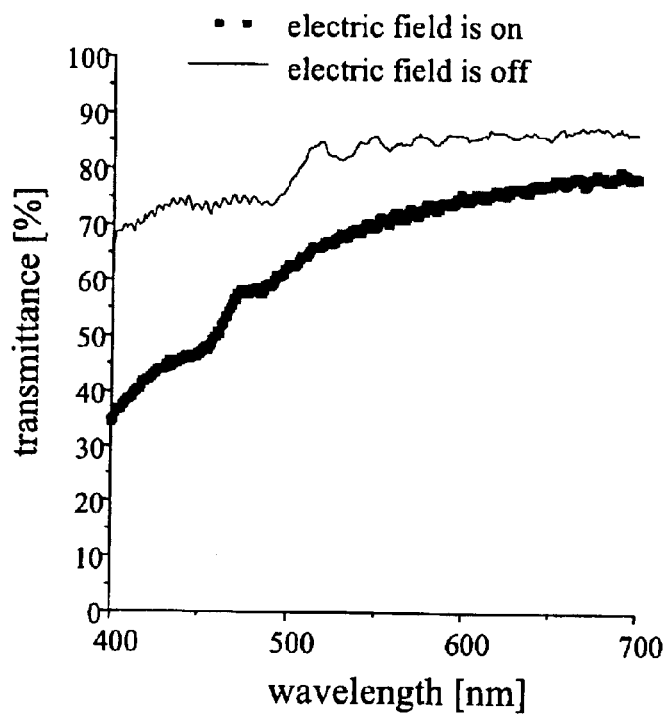
FIG. 10 shows the transmission spectrum of opposite polarization from FIG. 9.
Figure 12:
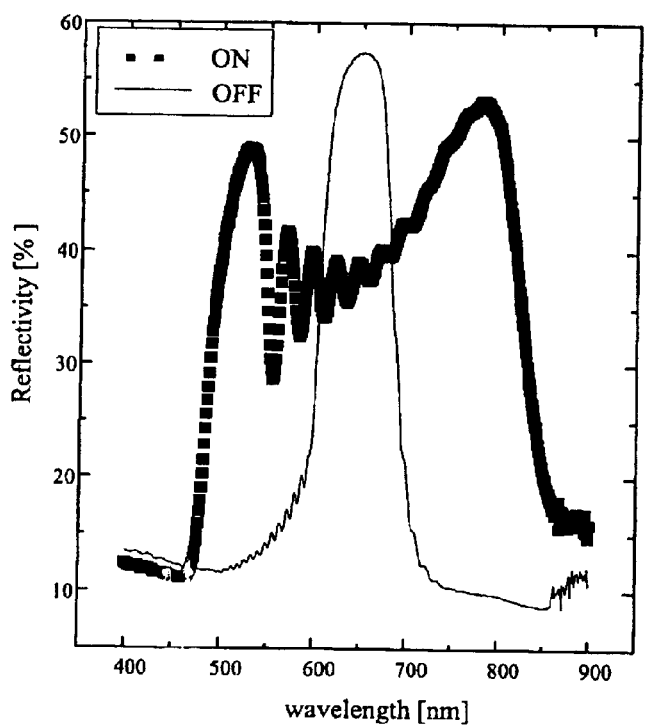
FIG. 12 is a transmission spectrum of the switchable reflective polarizer with the probing beam being left handed polarized.

FIG. 10 shows the transmission spectrum of a sample made with recipe #2 with the probing beam left-handed polarized ("parallel" with the sample.)

Figure 11:
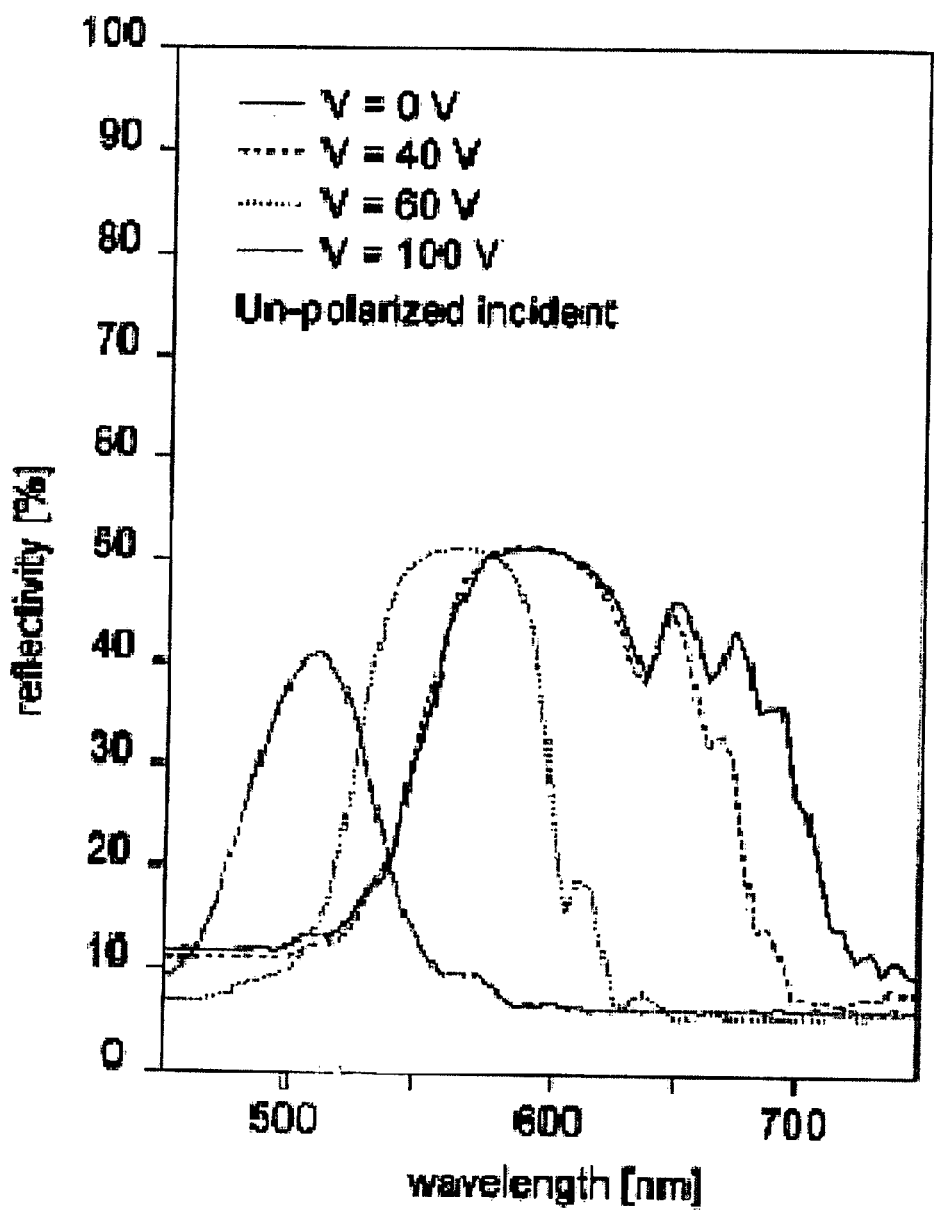
FIG. 11 shows the reflectivity of a sample of the first generalized embodiment for various voltages applied.

FIG. 11 shows the reflectivity in unpolarized light of a sample made from recipe #6 for various voltages applied. We surmise that the structure shown on the long wavelength side of this curve is due to defects and non-uniformities in the film, and that the long wavelength cut off of the reflectivity should be very sharp for a defect free film. The reflectivity for a specific wavelength could then be controlled by biasing the film, and a relatively small voltage added to the bias could be used to switch the film from reflecting to nonreflecting for that specific wavelength. This is of great importance to control of light by low voltage signals from inexpensive electronic apparatus. Even with the defected film shown in FIG. 11, a two volt change in applied voltage would double the reflectivity of the film for unpolarized light around 600 nm, and would change the reflectivity for the correct polarization by an even greater factor.

It should be pointed out that in all the examples, if the electric field is strong enough, the polarizers become semi-transparent. Therefore, this type of polarizer has three well distinguished optical states, i.e. narrow band polarizing state, broadband polarizing state, and non-polarizing semi-clear state, depending on the voltage applied We have observed that the reflectivity decreases significantly when the incident angle of the light is larger than 30°, and the light reflected starts to deviate from circularly polarized state to elliptically polarized state.

Broadband to Narrow-Band Switchable IR Polarizer

In order to create a switchable IR reflective polarizer according to the present invention, different liquid crystal material recipes, which generally contain polymerizable and non-polymerizable liquid crystal compounds, were tested (see Table III below) according to the following procedure.

1. The liquid crystal compounds were first weighed and thoroughly mixed according to the pre-determined ratio.
2. Glass substrates having an indium-tin-oxide (ITO) conductive coating were ultrasonically cleaned.
3. Polyamide was spin-coated onto the ITO glass substrates that were used to make the liquid crystal cells.
4. The liquid crystal mixture was filled into the cell.
5. After the sample was annealed at high temperature, it was cured at room temperature by 365-nm UV light of intensity $10^{-5}$ W/cm$^2$. The curing time was approximately one hour for a full cure. It should be mentioned that there was no electric voltage applied during the curing process.
6. Finally, the sample was characterized on a spectrophotometer.

The liquid crystal recipes listed in Table III were tested.

TABLE III

Liquid Crystal Recipes for the Switchable IR Reflective Polarizer

| Liquid crystal recipe | Film thickness | Curing condition | Results |
| --- | --- | --- | --- |
| 1 CM170 = 14.8%<br>E44 = 63.4%<br>CB15 = 14.6%<br>R1011 = 2.4%<br>R811 = 2.6%<br>IG 184* = 2.2% | d = 7.8μ | Tc** = Room-Temp.<br>UV = $10^{-5}$ W/cm$^2$ | Switchable visible polarizer.<br>Right-handed. See FIG. 1. |
| 2 CM170 = 15.5%<br>E44 = 66.8%<br>CB15 = 15.4%<br>R1011 = 0%<br>R811 = 0%<br>IG 184* = 2.3% | d = 7.8μ | Tc** = Room-temp.<br>UV = $10^{-5}$ W/cm$^2$ | Switchable IR polarizer.<br>Right-handed. See FIG. 2. |
| 3 CM170* = 14.9%<br>E44 = 55.1%<br>CB15 = 27.9%<br>R1011 = 0%<br>R811 = 0%<br>IG 184* = 2.1% | d = 7.8μ | Tc** = Room-temp.<br>UV = $10^{-5}$ W/cm$^2$ | Switchable visible polarizer.<br>Right-handed. See FIG. 3. |
| 4 CM171 = 20.0%<br>E44 = 48.7%<br>CB15 = 29.8%<br>R1011 = 0%<br>R811 = 0%<br>IG 184 = 1.5% | d = 7.8μ | Tc** = Room-temp.<br>UV = $10^{-5}$ W/cm$^2$ | Not switchable polarizer.<br>Right-handed. |

Notes:
*IG 184 is the photo initiator from Cyba Geigy.
**Tc is the curing temperature at which the sample is cured.

Figure 13:
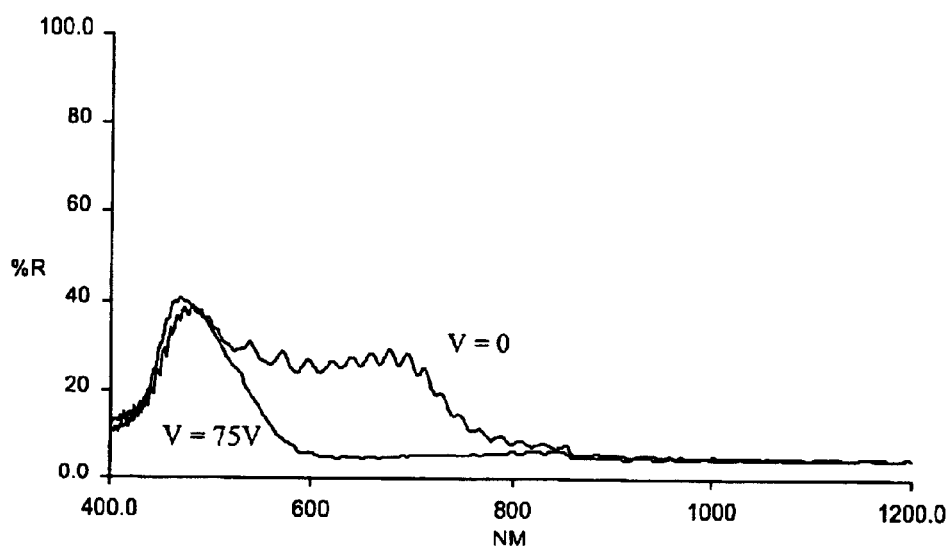
FIG. 13 is the reflection spectrum of a switchable reflective polarizer in the visible band, made from Recipe #1 in Table III.

Using Recipe #1 in Table III, a switchable reflective polarizer in the visible range from 450 to 750 nm was obtained. FIG. 13 shows the polarizer spectra as a function of applied voltage, obtained using the Perkin-Elmer Lambda 19 with an unpolarized light source.

Recipe #2 has been obtained by eliminating the chiral additives of R1011 and R811 from Recipe #1. Shown in FIG. 14, this recipe produced the most successful result. If no voltage is applied, the polarizer spontaneously covers a broad spectral band from 600–1200 nm in the NIR region. Upon applying an AC electric field (10V/μm at 1 kHz), the averaged reflectivity drops dramatically to a mere 2% in the switched part in spectrum, and the polarizer is switched from the broadband to a narrow band. It is believed that the final field-on narrow reflection peak at around 600 nm is due to the cholesteric liquid crystal polymer network. Note that this polarizer has negligible effect in the visible spectral region, so a substrate coated with this CLC film appears visually clear whether the voltage is applied or not. It is also noticed that the polarizer, before UV polymerization, exhibited a narrow band feature.

Second Type Spectrum Controllable Reflective Polarizer

The second type of controllable bandwidth polarizer exhibits a narrow band (70 nm) polarizing reflective state in the red spectral region when no electric field applied. However, when a low frequency or DC electric field is applied, this narrow band polarizer becomes a broadband reflective polarizer. Its bandwidth is extended to 350 nm with an averaged reflectivity no less than 40%.

It has been discovered that a very different effect occurs when the polymer is crosslinked with very high intensity UV light so that the low molecular weight molecules cannot diffuse far in the approximately 1 second polymerization time. It has been found that the resulting film has a very narrow bandwidth (70 nm), but that when an electric field was impressed across the field, the polarizing reflective bandwidth, surprisingly, broadened to 350 nm.

Using a different material blend containing a reactive cholesteric liquid crystalline (CLC) compound, other non-reactive liquid crystal(s) and chiral dopant(s), such a bandwidth changeable polarizer can be created using a very fast UV curing process which is opposite to the PIMRD process. In this process, a strong UV source (1 W/cm$^2$) and higher concentration of photo-initiator had been used. As a result, diffusing was restricted during the polymerization. In consequence, a much more uniform helical pitch distribution throughout the mixture was obtained, resulting in a narrow band width (70 nm) reflective polarizer.

A special right-handed reactive cholesteric liquid crystalline compound was mixed with a commercially available nematic liquid crystal and certain amount of chiral dopant. The purpose of adding chiral dopant is again to adjust the helical pitch. Photo-initiator was also added to start the polymerization process. A commercial high power UV light source, wavelength centered at 365 nm, was used to polymerize reactive liquid crystal component in the mixture. Spectrometry was carried out with a Perkin-Elmer Lambda 19.

A sample made of two ITO glass sheets coated with rubbed polyimide and separated by a thinner glass fiber spacers (8 μm), was filled with the new liquid crystal mixture, and then irradiated with a n intense UV light source at room temperature for a short period of time (in the order of second).

Figure 25:
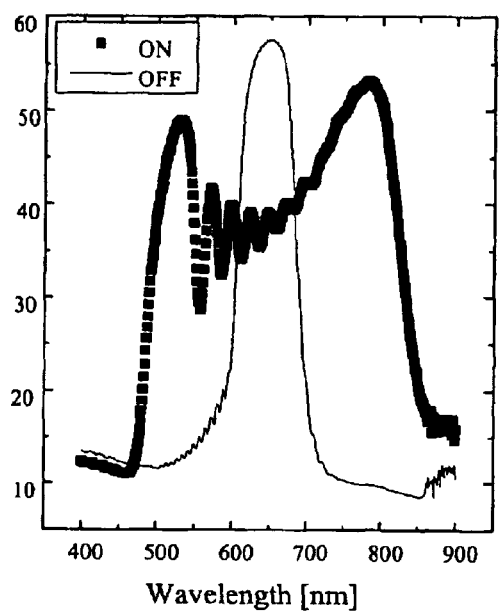
FIG. 25 is the reflection spectrum of the bandwidth changeable polarizer of the second type with the probing beam unpolarized.

FIG. 25 presents the reflection spectrums of the bandwidth changeable polarizer. With electric field off, the bandwidth is narrow, only amounts to about 70 nm, after a low frequency electric field 7 V/μm applied, the bandwidth is then broadened to 350 nm. From FIG. 25, we clearly see that the reflectivity is very high, even with the field applied, the reflectivity is still greater than 40% at normal direction, scattering plays an insignificant role here. By visual inspection, we found, with the low frequency electric field applied to the sample, that haze was not noticeable by naked eye.

It is believed that, due to the restriction on the diffusion during the polymerization of the mixture by using strong UV light source and higher photo-initiator concentration, the helical pitch distribution of the sample is narrow, and the distribution of the chiral polymer is also uniform though out the sample. When the low frequency electric field was applied, the polymer network with its own resulted helical structure was not affected due to its high cross-linking density. However, the non-reactive cholesteric liquid crystal components are affected by the electric field. The helical structure was untwisted. Below the threshold field, due to the constraint from the surfaces (thin sample, 8 μm) and the cross-linked cholesteric polymer, the non-reactive molecules closer to the polymer network would maintain their orientations, those are not so close to the polymer network would be aligned along the field. The result was a deformed spiral in both pitch and orientation. Therefore, the reflection band of such a helical structure is no longer narrowly centered at the original pitch, rather became a much broader one as we had observed in our laboratory. It has been observed that such an untwisting process has an intrinsic time constant in the order of seconds.

With both polarizers, it has been observed that the reflectivity decreases significantly when the incident angle of the light is larger than 30°, and the light reflected starts to deviate from circularly polarized state to elliptically polarized state.

The detailed first recipe (recipe #1) is a mixture of 12% by weight of a high molecular weight (HMW) CLC polymer [BASF 181(25% bisacrylates)], 61% of a low molecular weight nematic material E44 obtained from Merck, 25% of a chiral additive CB15 obtained from Merck, and 1.9% of a photoinitiator IG 184 from Ciba Geigy. In this process, a strong UV source (1 W/cm2) and higher concentration of photo-initiator had been used. As a result, diffusion of the low molecular weight molecules was restricted during the polymerization. In consequence, a much more uniform helical pitch distribution throughout the mixture was obtained, resulting in a narrow band width (70 nm) reflective polarizer when the electric field impressed in the film was low.

A special right-handed reactive cholesteric liquid crystalline compound was mixed with a commercially available nematic liquid crystal and certain amount of chiral dopant. The purpose of adding chiral dopant is again to adjust the helical pitch. Photo-initiator was also added to start the polymerization process. A commercial high power UV light source, wavelength centered at 365 nm, was used to polymerize reactive liquid crystal component in the mixture. Spectrometry was carried out with a Perkin-Elmer Lambda 19.

The sample, made of two ITO glass sheets coated with rubbed polyimide and separated by a thinner glass bead spacers (8 mm), was filled with the new liquid crystal mixture, and then irradiated with a intense UV light source at room temperature for a short period of time (in the order of second).

Preferred recipes have also been developed. They are listed as follows:

Recipe 2#: CM181 (365 nm) (BASF)=12%, CB15=25%, E44=61%, IG184=2%, d=10 micrometer, curing temperature 25° C., UV intensity 1W/cm2. Initial bandwidth 600~670 nm when no voltage is applied; with a voltage of 26V(DC), the bandwidth broadens from 500~740 nm (right-handed), switching voltage 26V (DC.). CM181 cross-linking density is low.

Recipe 3#: CM171 (507 nm)=12%, CB15=25%, E44=61%, IG184=2%, d=10 micrometer, curing temperature 25° C., UV intensity 1W/cm2. Initial bandwidth 680~770 nm when no voltage is applied; with a voltage of 30V(DC), the bandwidth broadens to cover from 450~850 nm (right-handed), switching voltage 30V (DC). CM171 cross-linking density is medium.

Recipe 4#: CM181 (365 nm)=12%, CB15=26%, E44=60%, IG184=2%, d=8 micrometer, curing temperature 25° C., UV intensity 1W/cm2. Initial bandwidth 620~680 nm when no voltage is applied; with a voltage of 45V(DC), the bandwidth from 470~850 nm (right-handed), switching voltage 45V (DC). CM171 cross-linking density is low.

Recipe 5#: CM181 (365 nm)=12%, CB15=26%, E44=60%, IG184=2%, d=8 micrometer, curing temperature 25° C., UV intensity 1W/cm2. Initial bandwidth 620~680 nm when no voltage is applied; with a voltage of 45V(DC), the bandwidth from 470~850 nm (right-handed), switching voltage 45V (DC). CM171 cross-linking density is low.

Various embodiments of the invention may be understood by reference to the following figures.

Figure 16:
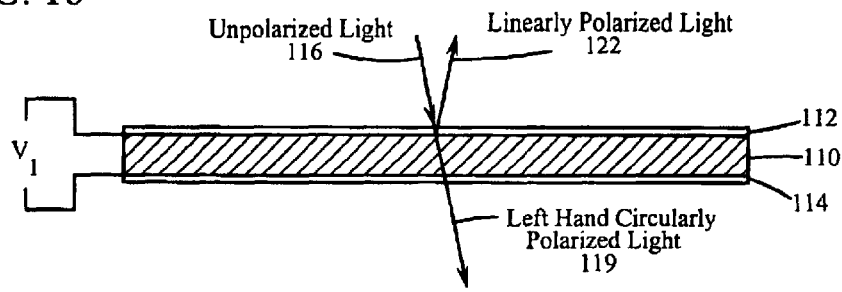
FIG. 16 shows the reflective polarizing film of the second generalized embodiment of the present invention.

FIG. 16 shows the film 110 of the second generalized embodiment of the present invention comprising a cross linked or polymerized material having a high molecular weight component and a low molecular weight CLC component. Film 110 is contacted by electrically conducting materials 112 and 114 which may have a voltage V1 applied to impress and electric field in the material of the invention. The materials 112 and 114 may contact the film 10 or be closely adjacent film 110. Unpolarized light 116 is shown incident on film 10 through conducting material 112, which is transparent to the light 116. Right hand circularly polarized light 118 is shown reflecting from film 110, while left hand circularly polarized light is shown transmitted through film 110 and through material 114. If material 114 does not absorb light, the left hand circularly polarized light remaining after transmission through film 110, the device of FIG. 16 is a polarizer. If light 119 is transmitted, the device of FIG. 16 is a polarizing beamsplitter. When the field is impressed in film 110 by raising the voltage V1, the bandwidth of the right hand circularly polarized light 118 broadens. If the light incident on to film 110 is right hand circularly polarized, the voltage may be used to change the device of FIG. 16 from a narrow band reflector of the light to a broad band reflector of the light.

Figure 17:
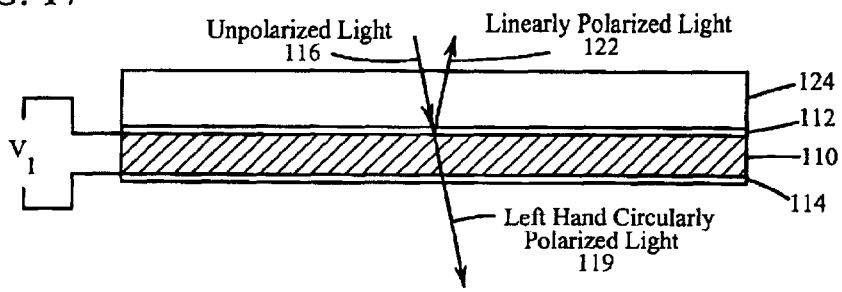
FIG. 17 shows the device of FIG. 16 with the addition of a $\lambda/4$ phase retardation plate.

FIG. 17 shows the device of FIG. 16 with the addition of a p/4 phase retardation plate 124. Unpolarized light incident on the device of 17 will be result in linearly polarized light being controllably reflected from the device. If linearly polarized light of the correct polarization is incident on the device of FIG. 17, the voltage may be used to control the bandwidth of the reflected light or the width of the "notch" in the transmitted light.

Figure 18:
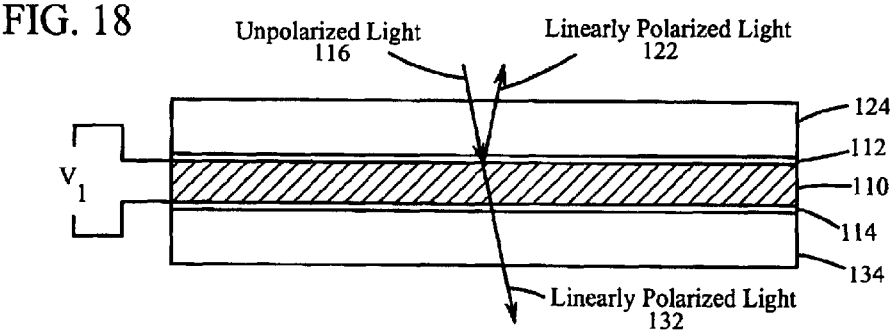
FIG. 18 shows an additional embodiment of the device of FIG. 17.

FIG. 18 shows an additional embodiment of the device of FIG. 17, whereby an additional p/4 phase retardation plate 134 converts the circularly polarized light remaining from the initially unpolarized incident light to a linearly polarized light beam 132 which has opposite polarization to the reflected beam 122.

Figure 19:
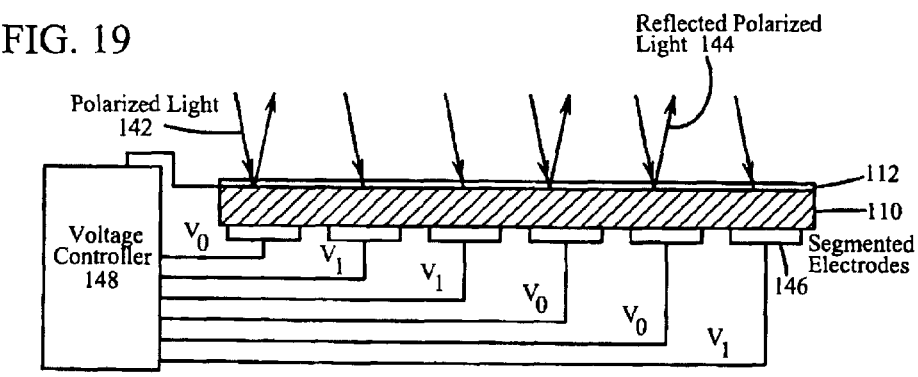
FIG. 19 shows the film of FIG. 16 used for display purposes.

FIG. 19 shows an embodiment of the film of the invention used for display purposes. The electric field in the film 110 of the invention is controlled to vary spatially across the area of the film 110 by a voltage controller 148 applying varying voltages to segmented electrodes 146. The bandwidth of light 42 is changed from the various areas of the film to give a display. In the case shown, polarized light may be used for light 142, and the polarized light in transmission may also be used as a display.

Figure 20:
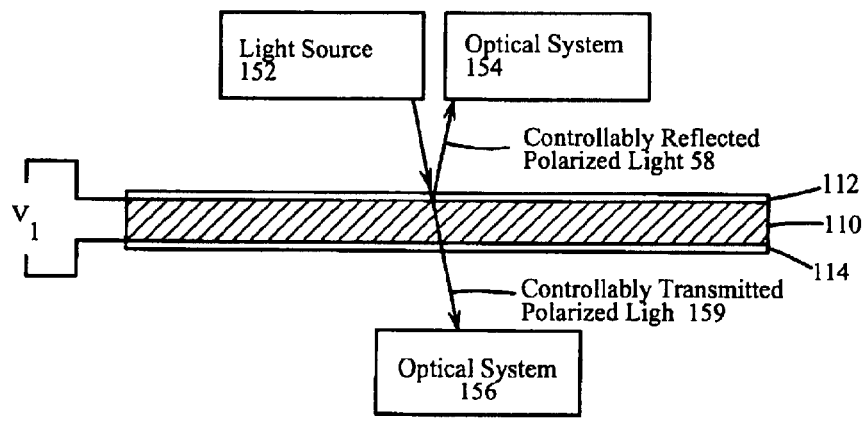
FIG. 20 shows an optical system using the film of the second generalized embodiment of the present invention.

FIG. 20 shows an optical system using the film of the invention, whereby the controllable bandwidth light beam 158 may be used in further optical systems 154, and the transmitted light beam 159 may have a "notch" controllable by the voltage applied across the conducting materials 110 and 112.

Figure 21:
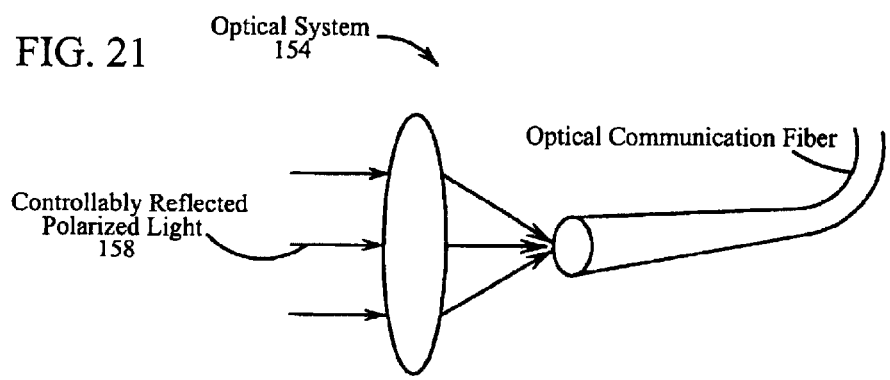
FIG. 21 shows an optical system for injecting a controlled bandwidth polarized light beam into an optical communication fiber 164.

FIG. 21 shows one example of an optical system 154 for injecting a controlled bandwidth polarized light beam 158 through a lens 162 into a n optical communication fiber 164.

Figure 22:
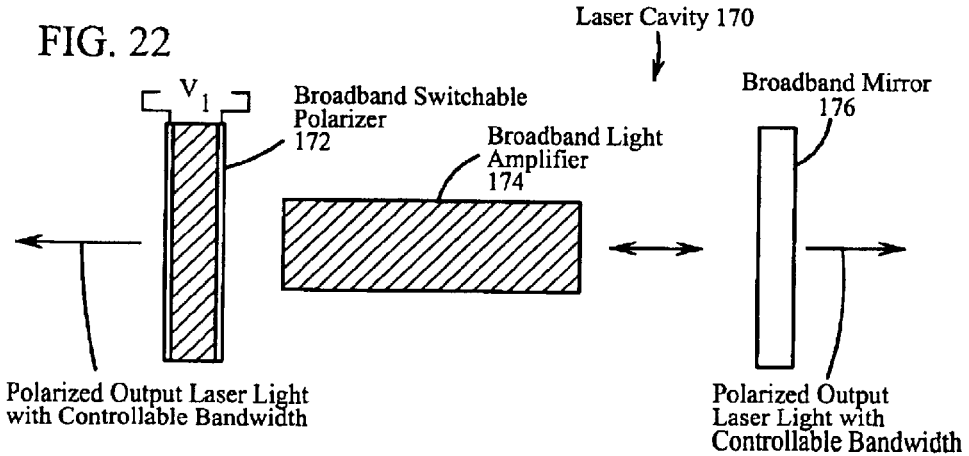
FIG. 22 shows the voltage controlled film of the second generalized embodiment of the present invention, employed as a cavity element in a laser cavity.

FIG. 22 shows an embodiment using the voltage controlled film of the invention as a cavity element in a laser cavity 170. The controllable bandwidth polarizing film is used here as cavity reflector 172 for a cavity comprising the controllable bandwidth polarizing film, a broadband light amplifier 174, and a broadband mirror 176. The device of FIG. 22 will lase and produce a controllable bandwidth of laser light at wavelengths where the reflectivity of the mirror 172 reaches a threshold value. The laser output may be drawn either from the mirror 172 or from the mirror 176, depending on the transmissions of the cavity reflectors.

Figure 23:
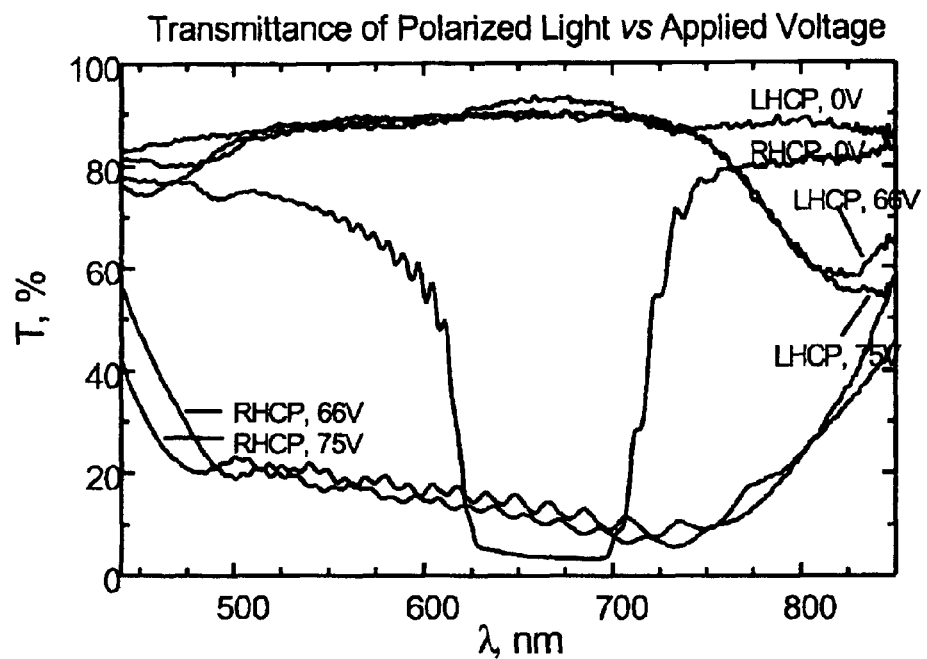
FIG. 23 shows the reflection spectra for unpolarized light of the bandwidth changeable polarizer for different values of the voltage across the film of the second generalized embodiment of the present invention.

FIG. 23 shows the reflection spectra for unpolarized light of the bandwidth changeable polarizer of recipe #1 for different values of the voltage across the film. With electric field off, the bandwidth is narrow, and only amounts to about 70 nm (FWHM). When a DC electric field of 7 V/mm is applied, the bandwidth is then broadened to 350 nm. Scattering plays an insignificant role here. By visual inspection, it has been found, with DC electric field applied to the sample, the haze was not noticeable by naked eyes.

Figure 24:
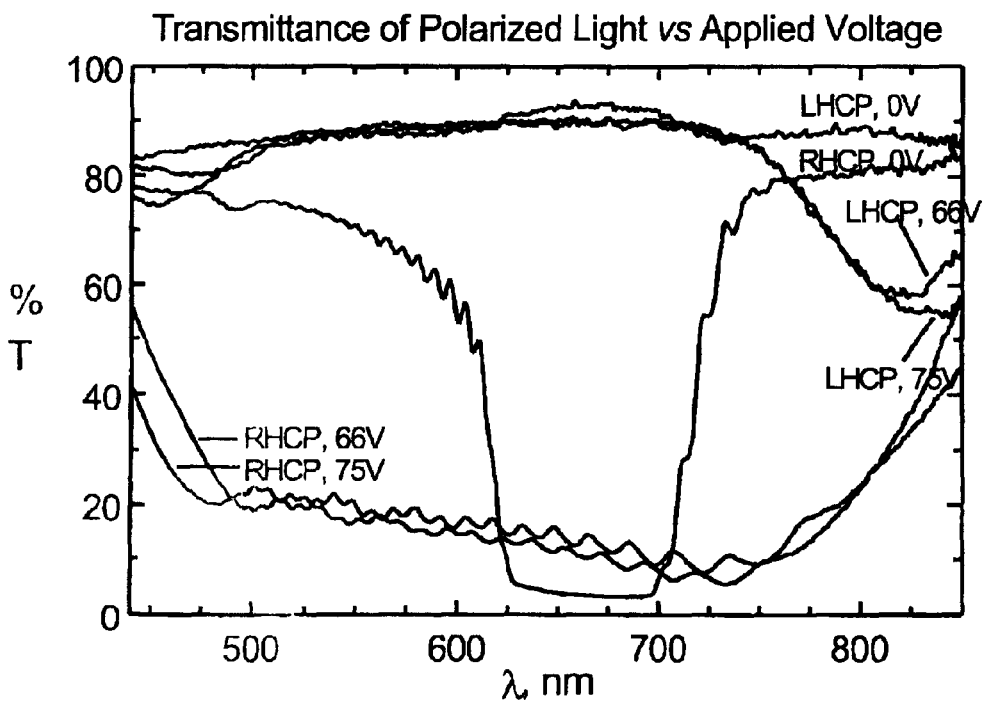
FIG. 24 shows the transmission spectra for right and left handed circularly polarized (RHCP and LHCP) light of a film of the second generalized embodiment of the present invention.

FIG. 24 shows the transmission spectra for right and left handed circularly polarized (RHCP and LHCP) light for a sample of film made from recipe #1.

It is believed that, due to the restriction on the diffusion during the polymerization of the mixture by using strong UV light source and higher photo-initiator concentration, the helical pitch distribution of the sample is narrow, and the distribution of the chiral polymer is also uniform though out the sample. When DC electric field was applied, the polymer network with its own resulted helical structure was not affected due to its high cross-linking density. However, the non-reactive cholesteric liquid crystal components are affected by the electric field. The helical structure was untwisted. Below the threshold field, due to the constraint form the surfaces (thin sample, 8 mm) and the cross-linked cholesteric polymer, the non-reactive molecules closer to the polymer network would maintain their orientations, those are not so close to the polymer network would be aligned along the field. The result was a deformed spiral. Therefore, the reflection band of such a helical structure is no longer narrowly centered at the pitch, rather became a much broader one as we had observed in our laboratory. It has also been observed that such a untwisting process has a intrinsic time constant in the order of seconds.

Narrow-Band to Broadband Switchable IR Polarizer

In order to fabricate the narrow-band to broadband switchable IR polarizer, liquid crystal cells were fabricated using a method similar to that discussed in the previous section, but with several distinct differences.

1. The cells were made using two glass substrates having an ITO conductive coating.
2. In order to align the liquid crystal, a polyimide coating was coated on top of the ITO followed by mechanical rubbing.
3. Cells were then filled with the uncured CLC mixture consisting of liquid crystal polymer in cholesteric phase, low molecular weight nematic liquid crystal, photo-initiator for polymerization and chiral additives.
4. After the liquid crystal was filled, the sample was annealed at an elevated temperature (70–80° C.).
5. The sample was then cooled to room-temperature and cured (polymerized) at room temperature by a much more powerful broadband (350–400 nm) UV light of intensity 4.4 W/cm$^2$. The curing time was about 5 seconds. There was no electric voltage applied during the curing process.
6. Finally, the sample was characterized on a spectrophotometer.

The following table describes the recipes tested to date for this type of switchable IR CLC reflective polarizer that switches from narrow to broad band via an applied electric field.

TABLE IV

Liquid Crystal Recipes for the Switchable IR Reflective Polarizer

| Liquid crystal recipe | Film thickness | Curing condition | Results |
|---|---|---|---|
| 1 ICM181[+] = 11.8%<br>E44[++] = 60.1%<br>CB15[+++] = 25.5%<br>IG 184[*] = 2.6% | d = 15.0 μm<br><br><br>d = 7.8 μm | Tc[] = Room-Temp.<br>UV intensity ~ 4.4 W/cm$^2$<br>for 6 s<br>Tc[] = Room-Temp.<br>UV intensity ~ 4.4 W/cm$^2$<br>for 5 s | Right-handed.<br>Applied AC field.<br>See FIG. 4.<br>Applied DC field<br>Right handed<br>switchable broad<br>band polarizer.<br>See FIG. 5. |
| 2 CM181 = 11.85%<br>E44 = 60.7%<br>CB15 24.8%<br>S1011 = 0.5%<br>IG 184[*] = 2.15% | d = 7.8 μm | Tc[**] = Room-Temp.<br>UV intensity ~ 4.4 W/cm$^2$<br>for ~5 s | Applied DC field<br>Right handed<br>switchable broad<br>band polarizer.<br>See FIG. 6. |
| 3 CM181 = 11.6%<br>E44 = 59.9%<br>CB15 = 25.2%<br>S1011 = 1.2%<br>IG 184[*] = 2.1% | d = 7.8 μm | Tc[**] = Room-Temp.<br>UV intensity ~ 4.4 W/cm$^2$<br>for ~5 s | Applied DC field<br>Right handed<br>switchable broad<br>band polarizer.<br>See FIG. 7. |
| 4 CM171[+] = 10.1%<br>E44 = 61.6%<br>CB15 = 24.6%<br>IG184 = 3.7 | d = 15.0 μm<br><br><br>d = 7.8 μm | Tc[] = Room-Temp.<br>UV intensity ~ 4.4 W/cm$^2$<br>for 6 s<br>Tc[] = Room-Temp.<br>UV intensity ~ 4.4 W/cm$^2$<br>for 5 s | Right-handed<br>Applied AC field.<br>See FIG. 8.<br>Applied DC field<br>Right handed<br>switchable broad<br>band polarizer.<br>See FIG. 9. |

Notes:
[+]CM181 and CM171 are liquid crystal polymers in cholesteric phase (BASF, Germany).
[++]E44 is the low molecular weight nematic from EMI.
[+++]CB15 is the chiral additive from EMI.
[*]IG 184 is a photo initiator from Cyba Geigy.
[**]Tc is the curing temperature at which the sample is cured.

Figure 26:
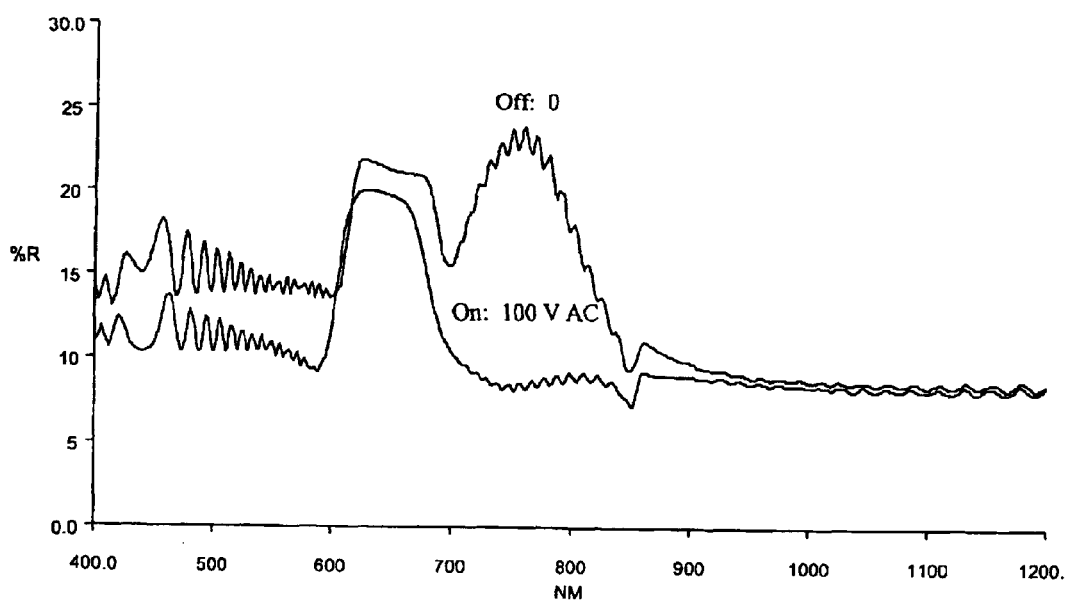
FIG. 26 is the reflection spectrum of a switchable reflective polarizer of Recipe #1 in Table IV switched by AC voltage.

The first sample was made with 15 micron glass spacers. It is switchable using an AC voltage (~1 kHz). As shown in FIG. 26, the polarizer switches from broad bandwidth to narrow bandwidth when the AC field is switched on.

Figure 27:
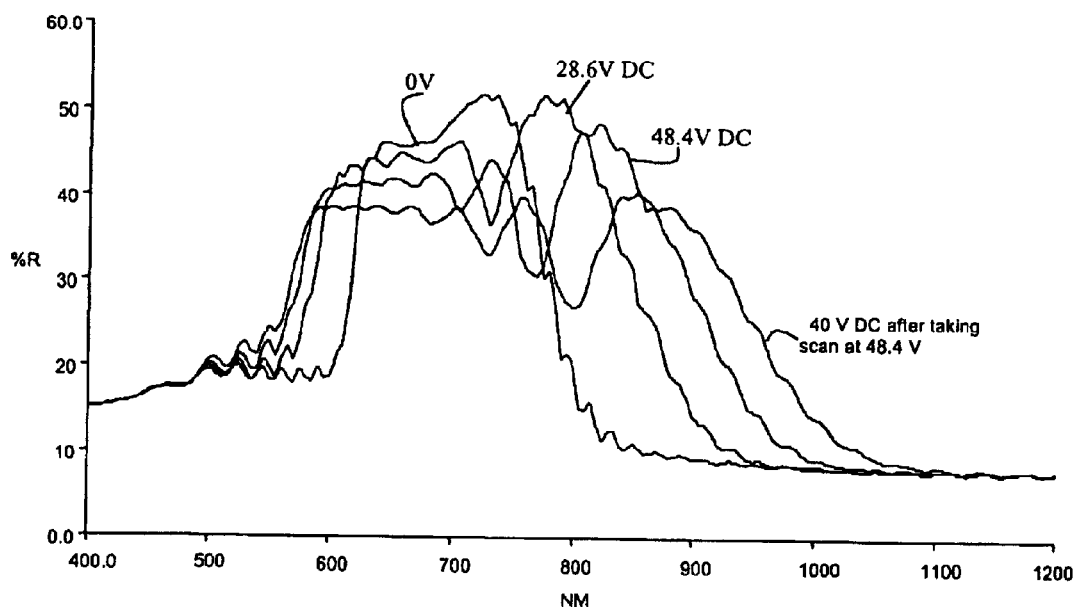
FIG. 27 is the reflection spectrum of a switchable reflective polarizer active in the IR band, switched by DC voltage, fabricated using Recipe #1 in Table IV.

Next we used the same recipe (Recipe #1 in Table IV) to fabricate another polarizer sample with a cell gap of 7.8 microns (achieved with glass spacers) and cured under similar conditions. This polarizer is switchable using a DC voltage rather than an AC voltage. The CLC polarizer shows bandwidth broadening into the IR region upon applying the field. This CLC polarizer difference in response to AC and DC voltage may be indicative of different mechanisms for bandwidth broadening and bandwidth narrowing of CLC polarizers with applied field. This switching shows hysteresis behavior from 48.4 V to 40 V as can be seen in FIG. 27. Here when the voltage is reduced after applying 48.4 V and re-increased to 40 V, a broader bandwidth is achieved than was originally achieved at 48.4 volts.

Figure 28:
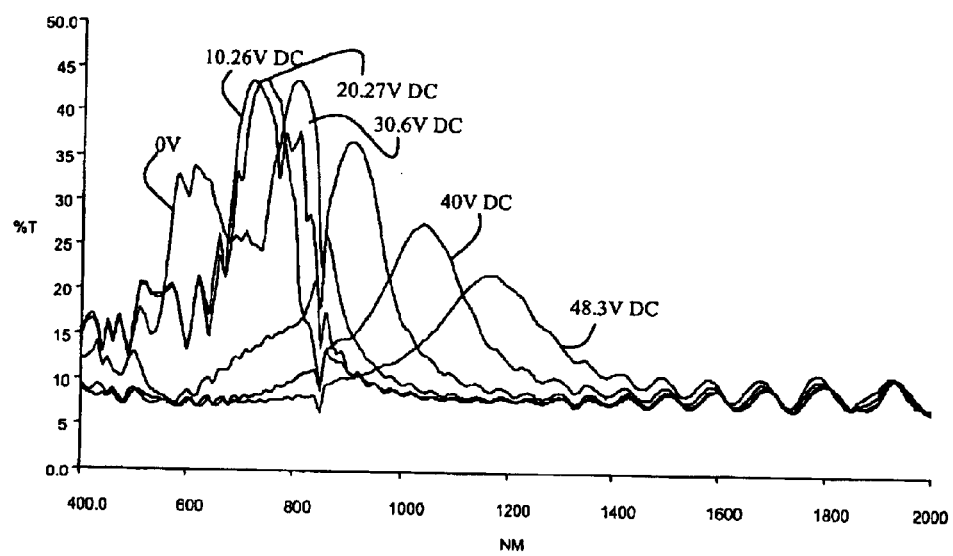
FIG. 28 is the transmission spectrum of a switchable reflective polarizer in the IR band, fabricated using Recipe #2 in Table IV.
Figure 29:
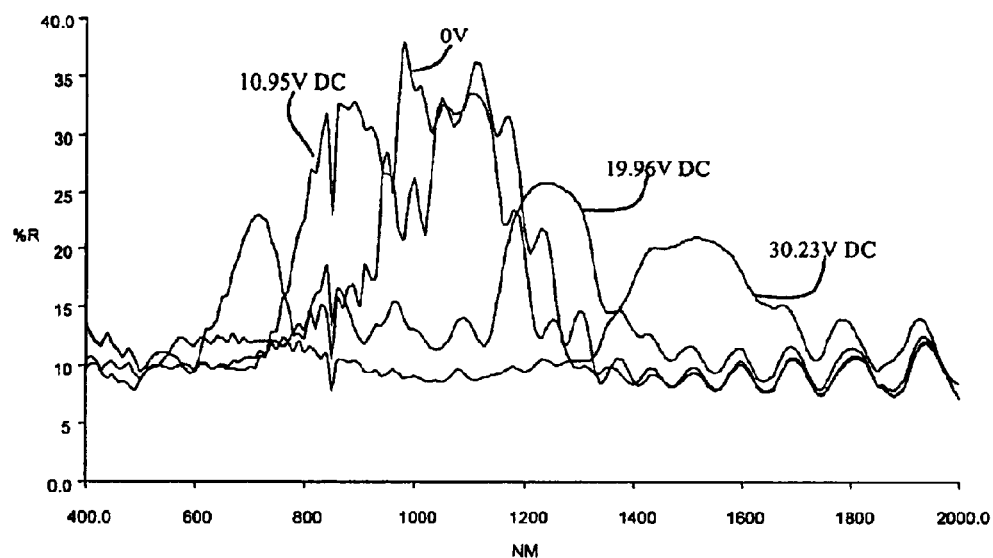
FIG. 29 is the reflection spectrum of a switchable reflective polarizer in the IR band, fabricated using Recipe #3 in Table IV.

FIGS. 28 and 29 show further improvements on Recipe #1 to shift the central wavelength of the switchable CLC polarizer to longer IR wavelengths by adding more chiral additives (S1011) which has an opposite handedness to the original CLC mixture. The opposite handedness chiral untwists the original CLC helix and therefore shifts the center wavelength toward to longer side. Doing this, a switchable broadband polarizer has been created that starts reflecting from 700 nm to 1,000 nm. However, it is seen that the reflectivity of this polarizer is low. Therefore, Recipes #2 and #3 will be further optimized to achieve substantially higher extinction ratios.

Figure 30:
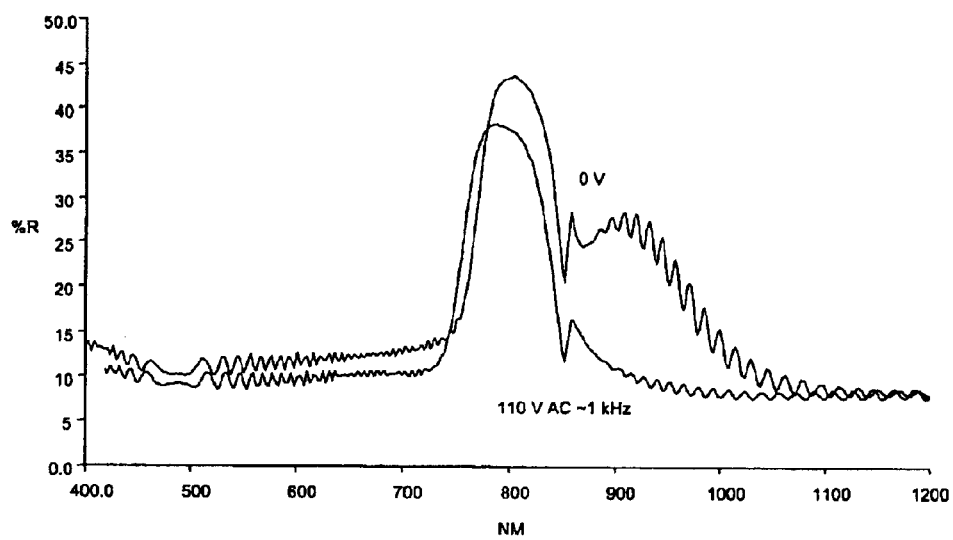
FIG. 30 is the reflection spectrum of a reflective polarizer switchable by an AC voltage, and fabricated using Recipe #4 in Table IV.
Figure 31:
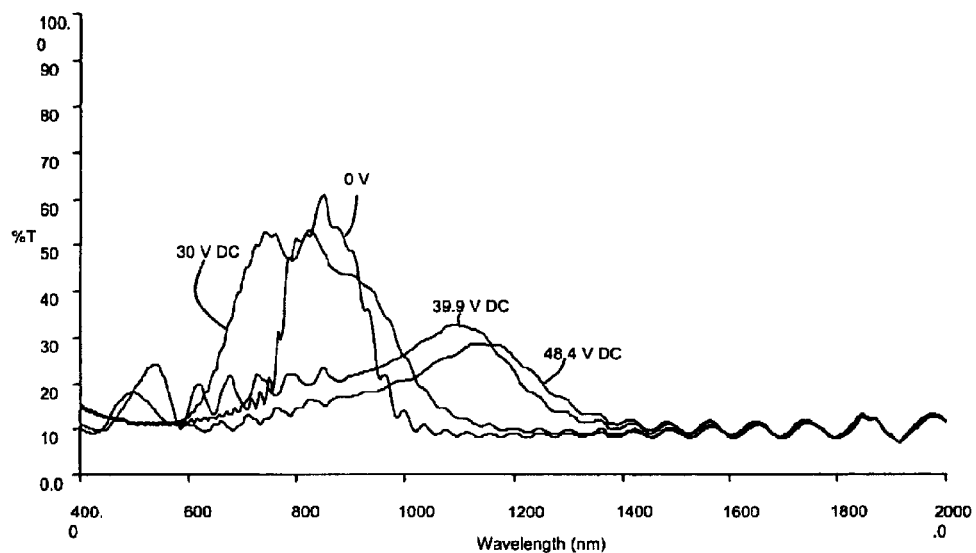
FIG. 31 is the transmission spectrum of a reflective polarizer switchable in the IR by DC voltage, and fabricated using Recipe #4 in Table IV.

FIGS. 30 and 31 show the response to AC and DC fields of a CLC cell fabricated using Recipe #4. In Recipe #4, the CLC polymer has been changed from CM181 to CM171 (both from BASF). CM171 has a medium cross-linking density and an intrinsic reflection wavelength at 507 nm. However, CM181 has a low cross-linking density and reflects at 365 nm wavelength. Since the CM171 has a longer reflection wavelength, the broadband polarizer fabricated has a longer center wavelength. As shown in FIG. 30, the 15 micron polarizer shows reflection bandwidth reduction upon application of an AC field (1 kHz). However, the 7.8 micron thick polarizer shows the opposite bandwidth switching behavior, i.e., it exhibits a bandwidth broadening under a DC voltage. This observation is similar to that shown in FIGS. 26 and 27.

Mechanisms of Operation

Two different mechanisms have been identified for generating switchable broadband polarizers: (1) pitch gradient (for first-type reflective polarizers), and (2) helix lengthening and mis-orientation for second-type reflective polarizers). The pitch gradient generally gives rise to a broadband effect when no electric field is applied, which corresponds to the first type of switchable broadband polarizer that is switched from broadband to narrow band. However, the helix mis-orientation plus the pitch length increase that is induced by the DC electric field are responsible for the second-type of switchable broadband polarizer whose bandwidth can be switched from narrow to broad.

Although atomic force microscope (AFM) would most directly identify the pitch distribution, it is difficult to apply in this case because the liquid crystal medium is in the semi-gel and liquid state due to the small amount of the polymer concentration in the polarizer. However, a computer simulation combined with a spectral measurement has been found to be satisfactorily effective in verifying the pitch distribution under different electric field strengths. As will be described in great detail in the next section, we first measured the transmission spectra of the sample under different voltages. These data were then used as input for a computer simulation based on a Berreman 4×4 matrix. Finally, comparing the measurement with the computer simulation indicates the pitch distribution and orientation under different electric field strengths. It should be noted that the first type of switchable IR polarizer is created by the same mechanism that governs other first type switchable polarizers,—a mechanism termed ultraviolet (UV) polymerization-induced molecular re-distribution (PIMRD), described hereinabove. In this process, a nonlinear helical pitch distribution induced along the CLC helical axis during the curing process is key. By controlling the UV curing intensity at an appropriate level, the polymerization process of the active liquid crystal compound (in this case, the liquid crystal polymer itself) induces segregation of the non-reactive compounds from the polymer. The segregated liquid crystal molecules start to diffuse along the UV radiation direction. As a result, some diffusing non-reactive molecules are "trapped" in the polymer network during the on-going polymerization. In regions where more non-reactive nematic liquid crystalline molecules have accumulated, the helical pitch becomes longer. Ultimately, this PIMRD mechanism yields a non-uniform helical pitch distribution throughout the mixture, resulting in a switchable reflective polarizer with a spontaneous broad bandwidth feature.

Figure 14:
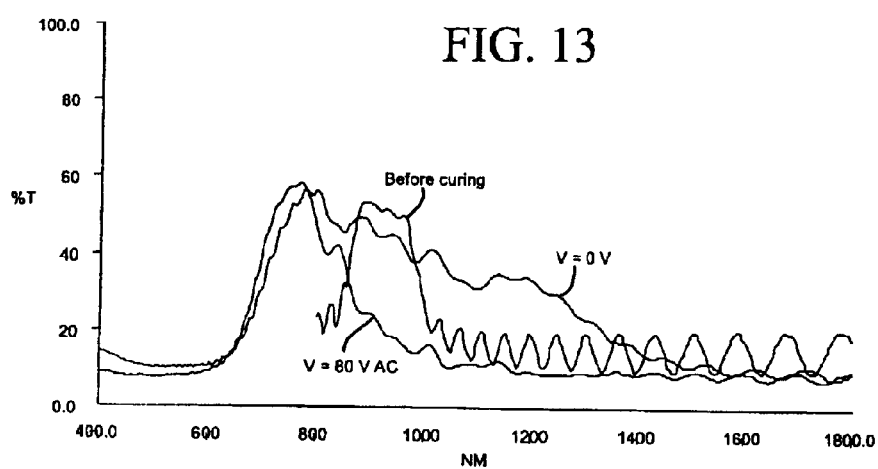
FIG. 14 is the transmission spectrum of a switchable reflective polarizer in the IR band, made from Recipe #2 in Table III.
Figure 15:
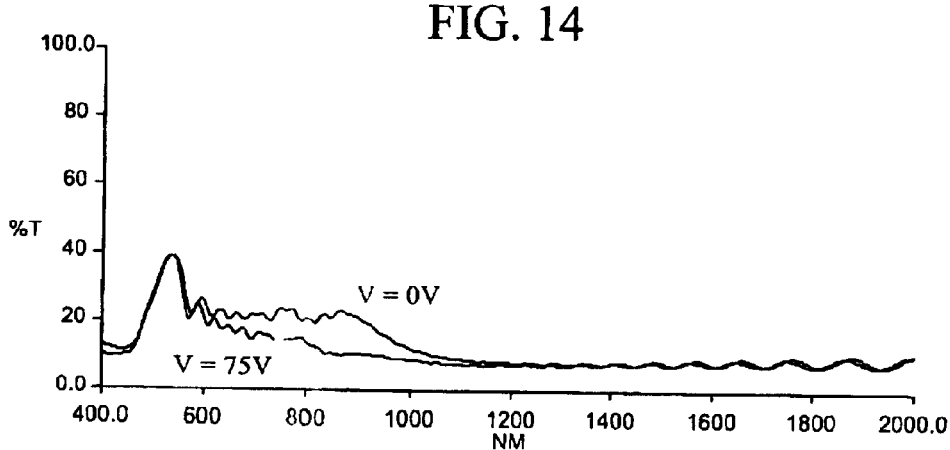
FIG. 15 is the transmission spectrum of a switchable reflective polarizer in the visible band, made from Recipe #3 in Table III.

Different from the recipe used for creating the switchable polarizer in the visible, the recipe for the polarizer in the IR was obtained by shifting the polarizer's center wavelength to longer wavelength, as shown by the narrow band curve in FIG. 14. To lengthen the center wavelength, higher concentrations of the nematic liquid crystal (E44) have been added to the mixture.

Figure 32:
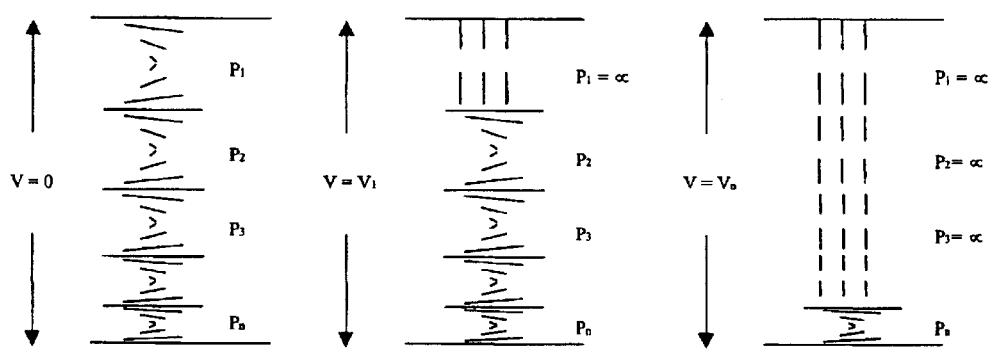
FIG. 32 is a schematic illustration of the pitch increase and mis-orientation evolution of the second-type of reflective polarizer under an electric field.

Broad-to-Narrow Mechanism:

The switching of this type of polarizer from broadband to narrow band is realized through molecular reorientation induced by the electric field. The broadband polarizer inherently has a pitch gradient across the film thickness that corresponds to the liquid crystal component gradient; at the site where the pitch is longer, the low molecular weight nematic (e.g. E44) concentration is higher. Therefore, the helix at the longer pitch site becomes easier to untwist to a homeotropic orientation due to the easier reorientation of the E44 molecules by the electric field, since the nematic E44 has a larger positive dielectric anisotropy and lower viscosity. As a result, the polarizer reflectivity at longer wavelength disappears first when the voltage reaches to a certain level. However, the shorter pitch is more difficult to untwist under the same electric field because of the higher concentration of the polymer network. In order to switch the shorter pitch, the electric field must be further increased. Therefore, the polarizer bandwidth further reduces. There exists a point where the concentration of the liquid crystal polymer is so high that molecular reorientation by the electric field becomes impossible. This corresponds to the shortest pitch or the shortest reflection wavelength since the liquid crystal polymer used in the mixture has a short intrinsic pitch. FIG. 32 schematically illustrates this switching mechanism.

Figure 33:
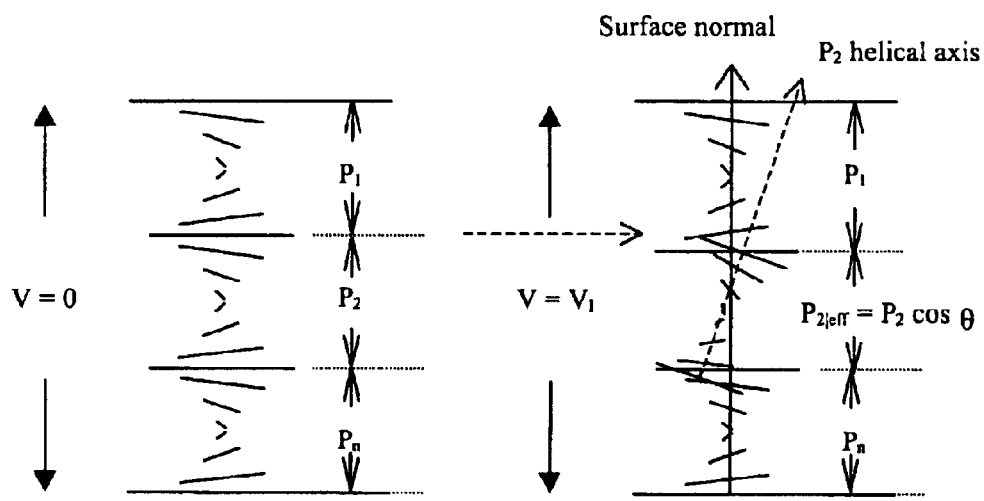
FIG. 33 is a schematic illustration of the pitch increase and mis-orientation evolution of the second-type of reflective polarizer under an electric field.

Narrow-to-Broad Mechanism:

The switching mechanism for the second type of polarizer (narrow-to-broad band) is more complicated. It is important to point out that a DC electric field is necessary in order to realize such switching. When no electric field is applied, this type of polarizer is in a rather narrow bandwidth state. However, there still exists a minor pitch gradient due to the liquid crystal component gradient that is caused by the faster UV polymerization of the mixture. Under a sufficient field, but still below the homeotropic transition threshold field, the reorientation of the low molecular weight nematic E44 material takes place, which increases the pitch length. As a result there is a wavelength shift toward to longer wavelength. On the other hand, the increase of the pitch length will cause some of the pitches to be mis-oriented. In other words, the mis-oriented pitch has a helical axis no longer parallel to the film surface normal. In this situation, normally-incident light experiences a shorter pitch. Therefore, the reflection wavelength is shifted to the shorter side. On the other hand, the tilt of the liquid crystal molecules reduces the average refractive index. This, in part, causes the further expansion toward to the shorter wavelength side as the reflected wavelength depends on both the pitch of the CLC and the average index of refraction. In short, the pitch length increase due to the liquid crystal reorientation by the electric field is responsible for the reflection band expansion toward longer wavelengths. While the pitch mis-orientation as well as the reduction of the effective refractive index corresponds to the polarizer spectral shift toward the shorter wavelength, the shorter and longer wavelength expansions happen simultaneously once an electric field is applied. This switching mechanism is illustrated schematically in FIG. 33.

These proposed mechanisms have been further validated by the computer simulation results.

In conclusion, two types of single layer spectrum controllable reflective polarizers have been invented which can make many new applications possible. Both types of polarizers (or generalized embodiments as referred to hereinabove) are made from liquid crystal blends containing cross-linkable and non-cross-linkable compounds. The first type polarizer, with a 10 micron thickness, can be switched from a broadband (about 220 nm) to a narrow band (40 nm) by an electric field. On the contrary, the second type polarizer, with a 8 micron thickness, can be switched from a narrow band (70 nm) to broadband (350 nm). Both polarizers exhibit an extinction ratio over 15:1.

These polarizers, with their broad bandwidth capability and electronic controllability, will find wide application in variety of fields. For one example, they can be used as window glazings in buildings where certain amount of control over sunlight is desired. Examples of such applications are disclosed in Applicants' International Application PCT/US98/03688 entitled "Electro-Optical Glazing Structures Having Reflection And Transparent Modes of Operation" filed internationally on Feb. 25, 1999, published on Sep. 3, 1999 as WIPO Publication No. WO 98/38547, incorporated herein by reference in its entirety.

Another application of the present invention would be in a reflective-type display structure, wherein there are no color filters and no other polarizers other than the switchable circular reflective polarizers of the present invention.

The novel polarizers of the present invention can be used for many other applications including IR switchable glazing for energy conservation. In today's advanced glazing market, there are several new technologies that effectively manage the solar radiation into buildings. One example is the 20% low-e IGU glazing which has special metal deposition film that rejects the solar radiation from entering into buildings. However, such product has the following disadvantages. First, it has a very low transmittance in the visible because of the broader cut-off spectral tail in the reflection of the metal film. As a result, the electric power is increased for interior lightening. Second, it is passive, which means that its optical property can not be altered by any means.

Figure 34:
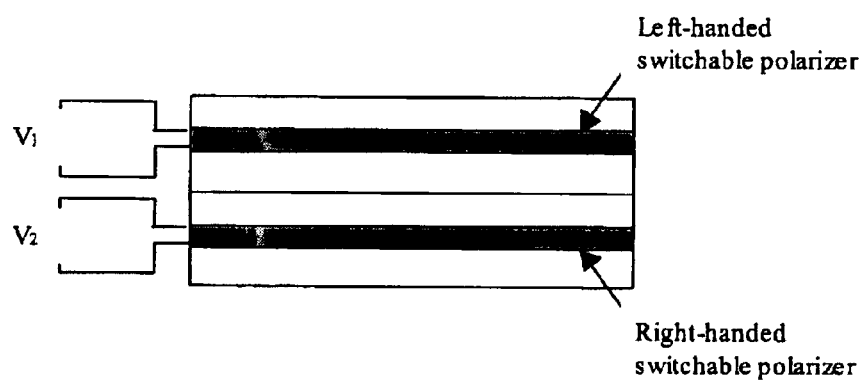
FIG. 34 is a schematic representation of a novel glazing structure incorporating the switchable reflective CLC polarizers of the present invention.

This means that the glazing is only effective in the cooling dominant area where the weather is hot. However, it is less effective if solar IR is desired to assist interior heating in the heating dominant area where the weather is cold. However, all these problems can be immediately solved by the switchable IR polarizers of the present invention. By adjusting the voltage applied onto the switchable reflective polarizers hereof, the electro-optical glazing embodying the same, as shown in FIG. 34, for example, can transmits IR radiation between 0 and 100%. Therefore, such electro-optical glazings will be effective in any location despite of the local weather condition. The new switchable polarizer can be used to build IR detection and imaging system that allows a temporal management of the IR radiation transmittance and wavelength selection.

The switchable/controllable reflective polarizers of the present invention can be used in many scientific research activities where temporal IR polarization management becomes important.

The switchable/controllable reflective polarizers of the present invention can also be used to construct an IR polarimeter which fully analyze the IR radiation polarization state. When this instrument is jointly used with an IR detection or imaging system, it will further enhance the detectability as well as the accuracy of the detection system.

The switchable/controllable reflective polarizers of the present invention can be used in automotive vehicles, maritime vessels, aircrafts and spacecrafts.

The illustrative embodiments and modifications thereto described hereinabove are merely exemplary. It is understood that other modifications to the illustrative embodiments will readily occur to persons with ordinary skill in the art. All such modifications and variations are deemed to be within the scope and spirit of the present invention as defined by the accompanying claims to Invention.

What is claimed is:

1. A light controlling film, the film having a first surface and a second surface, comprising:
    a polymerized polymer network, the polymer network varying spatially in a direction normal to the first surface, the polymerized polymer network comprising:
    a crosslinked high molecular weight polymeric material; and
    a low molecular weight liquid crystal material, the crosslinked high molecular weight polymeric material provided in an amount less than 20% by weight of the film,
    wherein the high molecular weight and the low molecular weight form a material having cholesteric liquid crystal (CLC) order, the CLC order oriented with respect to the first and the second surfaces, the pitch of the CLC order varying non-linearly in a direction perpendicular to the first surface, and
    wherein light having a first polarization and a broad bandwidth incident on the first surface is substantially reflected from the film, and wherein light having a second polarization and the broad bandwidth incident on the first surface is not substantially reflected from the film, and wherein an electric field impressed in the film controls the reflection of light having the first polarization when the electric field has a component in a direction normal to the first surface.

2. The light controlling film of claim 1, wherein the crosslinked high molecular weight polymeric material is less than 15% by weight of the film.

3. The light controlling film of claim 2, wherein the crosslinked high molecular weight polymeric material is less than 10% by weight of the film.

4. The light controlling film of claim 1, further comprising electrically conducting material adjacent to the first surface for impressing an electric field in the film, the electrically conducting material transmitting the light having the broad bandwidth and the first polarization.

5. The apparatus of claim 4, further comprising a second electrically conducting material adjacent to the second surface, wherein a voltage applied between the first and the second electrically conducting material impresses an electric field on in the film.

6. The apparatus of claim 5, wherein the second electrically conducting material transmits light having the broad bandwidth.

7. The apparatus of claim 5, wherein the first polarization is a circular polarization.

8. The apparatus of claim 7, further comprising a transparent quarter wave retardation plate in close proximity to the first surface, whereby linearly polarized light incident on the transparent quarter wave retardation plate is controllably reflected.

9. The apparatus of claim 4, further comprising a means for applying an electric field in the film, the electric field varying spatially over the first surface, whereby polarized light is controllably reflected for display purposes.

10. The apparatus of claim 4, further comprising a means for applying an electric field in the film, the electric field having a controllable bias field and a controllable adjustment field, whereby the reflectivity of polarized light may be substantially changed by changing the controllable adjustment field.

11. The apparatus of claim 4, further comprising optical communication means, whereby the light in the optical communication means is controlled.

12. The apparatus of claim 4, further comprising means for directing light on to the first surface, and means for receiving reflected light from the first surface, whereby polarized light with a controllable bandwidth is the light in the means for receiving reflected light.

13. The apparatus of claim 4, further comprising laser cavity means, whereby the output of the laser cavity means is controlled by the film when the film is used as a reflective element in the laser cavity.

14. The apparatus of claim 4, further comprising a transparent quarter wave retardation plate in close proximity to the first surface, whereby linearly polarized light incident on the transparent quarter wave retardation plate is controllably reflected.

15. A system for controlling EM radiation comprising:
    a substrate;
    a light controlling film of claim 1 on the substrate for reflecting the electromagnetic (EM) radiation, the reflected EM radiation being polarized, the reflected EM radiation having a broad bandwidth;
    an electric field generator for generating a variable electric field in the light controlling film; and
    a controller for controlling the electric field generator;
    whereby the controller controls the electric field generator to generate a field in the light controlling film and whereby the reflected EM radiation changes in response to the change of the electric field.

16. The light controlling film of claim 1 in combination with an additional light controlling film reflecting the opposite polarization, whereby the bandwidth of both polarizations of light reflected from the combination is very broad, and whereby the reflectivity of light in the broad bandwidth may be controlled by the electric field.

17. The combination of claim 16 controllably reflecting visible light in combination with a broad band infra-red reflecting and visible transmitting component, whereby visible light may be controllably transmitted and infra-red light may be reflected.

18. The combination of claim 16 controllably reflecting visible light in combination with a light controlling film controllably reflecting infra-red light, having a first surface and a second surface, comprising:
- a polymerized polymer network, the polymer network varying spatially in a direction normal to the first surface, the polymerized polymer network comprising:
- a cross-linked high molecular weight polymeric material; and
- a low molecular weight liquid crystal material, the crosslinked high molecular weight polymeric material provided in an amount less than 20% by weight of the film, wherein the high molecular weight and the low molecular weight form a material having cholesteric liquid crystal (CLC) order, the CLC order oriented with respect to the first and second surfaces, the pitch of the CLC order varying non-linearly in a direction perpendicular to the first surface, and wherein light having a first polarization and a broad bandwidth incident on the first surface is substantially reflected from the film, and wherein light having a second polarization and the broad bandwidth incident on the first surface is not substantially reflected from the film, and wherein an electric field impressed in the film controls the reflection of light having the first polarization when the electric field has a component in a direction normal to the first surface, whereby visible light may be controllably transmitted and infra-red light may be controllably transmitted.

* * * * *